US012598558B2

(12) United States Patent (10) Patent No.: US 12,598,558 B2

Khoshnevisan et al. (45) Date of Patent: Apr. 7, 2026

(54) JOINT MPE REPORT FOR SINGLE-PANEL AND MULTI-PANEL TRANSMISSIONS

(71) Applicant: QUALCOMM Incorporated, San Diego, CA (US)

(72) Inventors: Mostafa Khoshnevisan, San Diego, CA (US); Yitao Chen, San Diego, CA (US); Yan Zhou, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 18/054,899

(22) Filed: Nov. 12, 2022

(65) Prior Publication Data

US 2024/0172132 A1 May 23, 2024

(51) Int. Cl.
*H04W 52/36* (2009.01)
*H04L 5/00* (2006.01)

(52) U.S. Cl.
CPC ........... *H04W 52/365* (2013.01); *H04L 5/001* (2013.01); *H04W 52/367* (2013.01)

(58) Field of Classification Search
CPC .... H04W 52/365; H04W 52/367; H04L 5/001
See application file for complete search history.

(56) References Cited

U.S. PATENT DOCUMENTS

2021/0297104 A1* 9/2021 Zhou .................... H04B 7/0691
2022/0217654 A1* 7/2022 Kang .................... H04W 52/14

2023/0048026 A1* 2/2023 Huang .................. H04W 72/23
2024/0155511 A1* 5/2024 Chung .................. H04W 52/36
2025/0081124 A1* 3/2025 Yao ...................... H04W 72/046

FOREIGN PATENT DOCUMENTS

WO 2021188764 A1 9/2021

OTHER PUBLICATIONS

Partial International Search Report—PCT/US2023/035347—ISA/EPO—Feb. 19, 2024.

(Continued)

*Primary Examiner* — Elton Williams

(74) *Attorney, Agent, or Firm* — QUALCOMM Incorporated

(57) ABSTRACT

A UE receives, from a network node, a configuration for two uplink (UL) transmissions on a component carrier (CC); and transmits, to the network node and in response to at least one power headroom report (PHR) transmission condition, an indication that corresponds to two maximum permissible exposure (MPE) values associated with at least two sounding reference signal (SRS) resource sets, respectively, for the one or more simultaneous UL transmissions on the CC. The UE receives, from a network node, a configuration for a set of MPE indication parameters that is associated with a first MPE resource pool and a second MPE resource pool at the UE; and transmits, to the network node, an indication of values for the set of MPE indication parameters associated with the first MPE resource pool and the second MPE resource pool.

30 Claims, 21 Drawing Sheets

(56)                    References Cited

OTHER PUBLICATIONS

Qualcomm Incorporated: "Simultaneous Multi-panel Transmission", 3GPP TSG-RAN WG1 Meeting #110-bis-e, R1-2209972, 3rd Generation Partnership Project, Mobile Competence Centre, 650, Route Des Lucioles, F-06921 Sophia-Antipolis Cedex, France, vol. RAN WG1, No. e-Meeting; Oct. 10, 2022-Oct. 19, 2022 Sep. 30, 2022, 18 Pages, XP052259444, Section 6, proposal 14 and paragraph above, p. 14.
International Search Report and Written Opinion—PCT/US2023/035347—ISA/EPO—Apr. 9, 2024.

* cited by examiner

FIG. 4

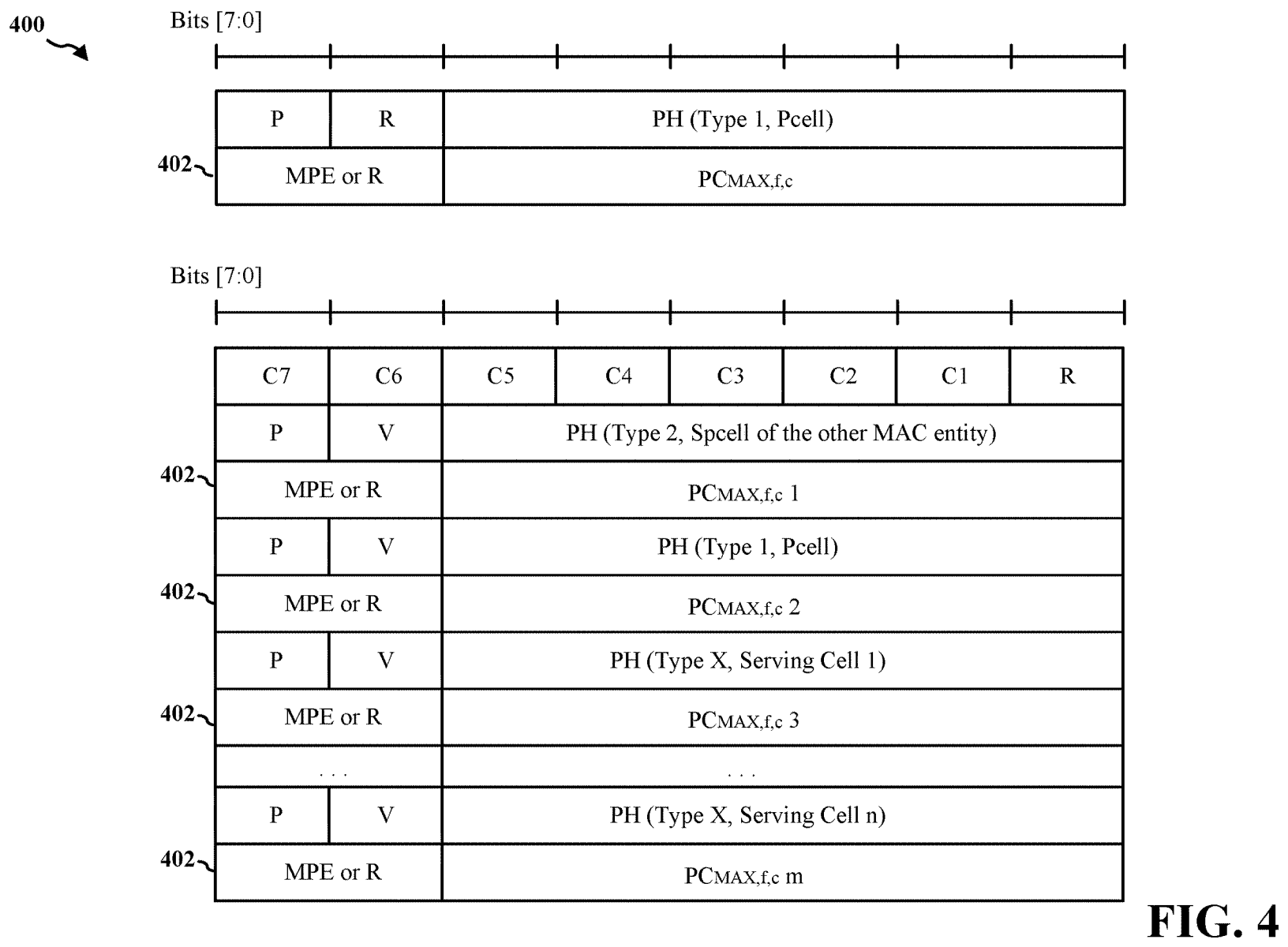

Bits [7:0]

| P | R | PH (Type 1, Pcell) |
|---|---|---|

402 — MPE or R | PCMAX,f,c

Bits [7:0]

| C7 | C6 | C5 | C4 | C3 | C2 | C1 | R |
|----|----|----|----|----|----|----|---|
| P | V | PH (Type 2, Spcell of the other MAC entity) | | | | | |

402 — MPE or R | PCMAX,f,c 1

| P | V | PH (Type 1, Pcell) | | | | | |

402 — MPE or R | PCMAX,f,c 2

| P | V | PH (Type X, Serving Cell 1) | | | | | |

402 — MPE or R | PCMAX,f,c 3

... ...

| P | V | PH (Type X, Serving Cell n) | | | | | |

402 — MPE or R | PCMAX,f,c m

400

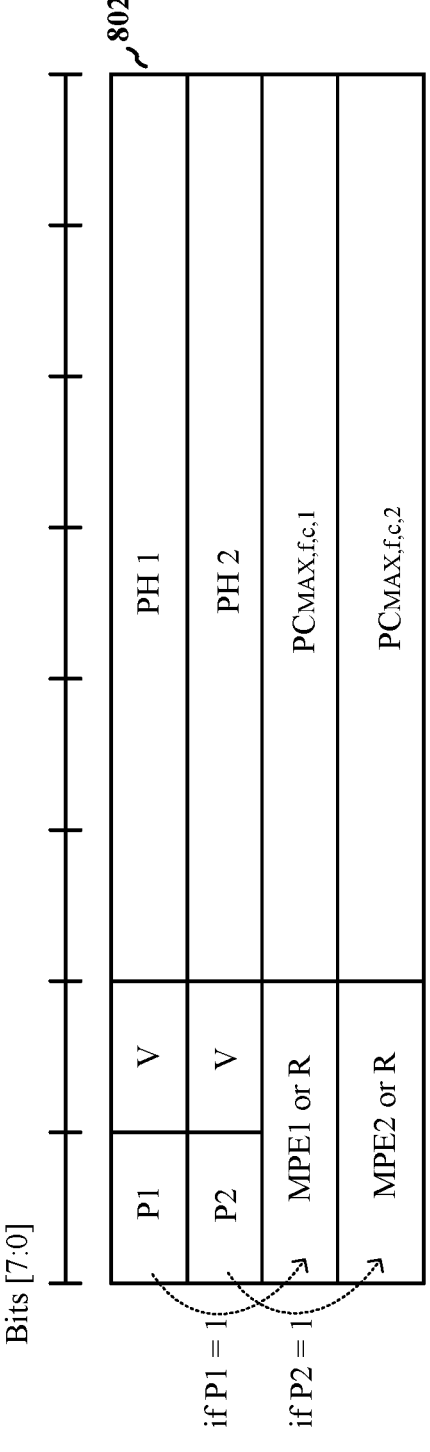
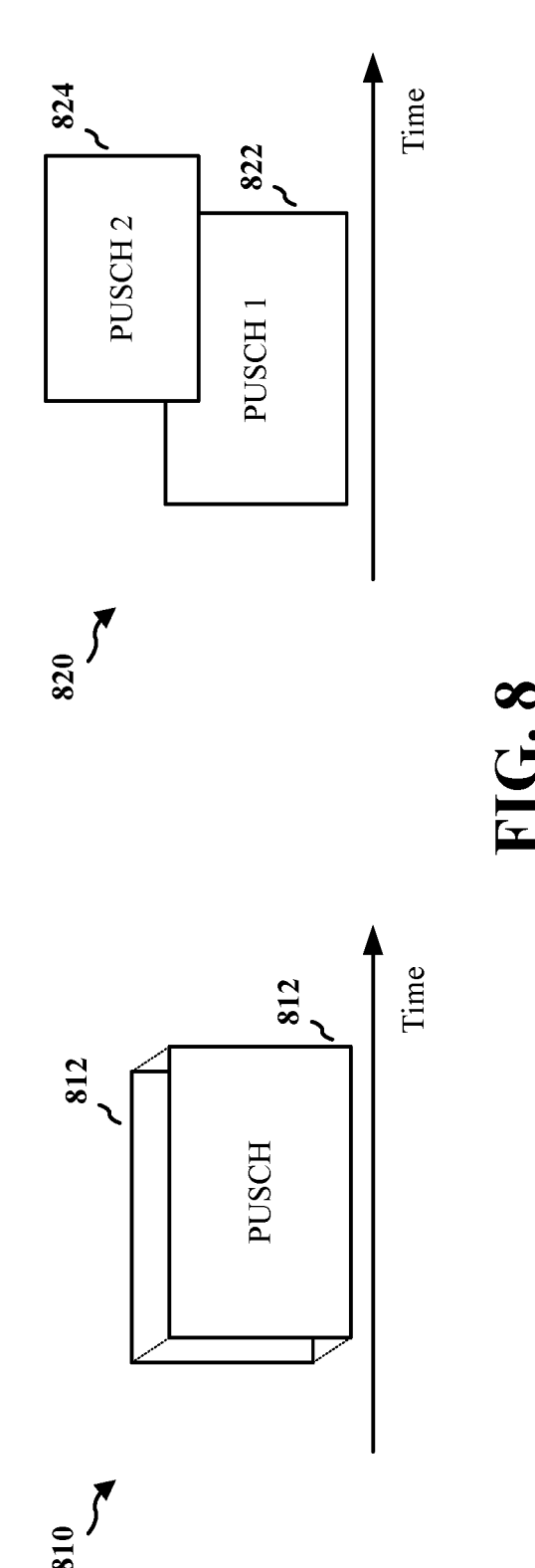
FIG. 8

1400

1402 receive, from a network node, a configuration for one or more simultaneous UL transmissions on a CC

1404 transmit, to the network node and in response to at least one PHR transmission condition, an indication that corresponds to two MPE values associated with at least two SRS resource sets, respectively, for the one or more simultaneous UL transmissions on the CC

1500

1502 receive, from a network node, a configuration for a set of MPE indication parameters that is associated with a first MPE resource pool and a second MPE resource pool at the UE

1504 transmit, to the network node, an indication of values for the MPE indication parameters associated with the first MPE resource pool and the second MPE resource pool

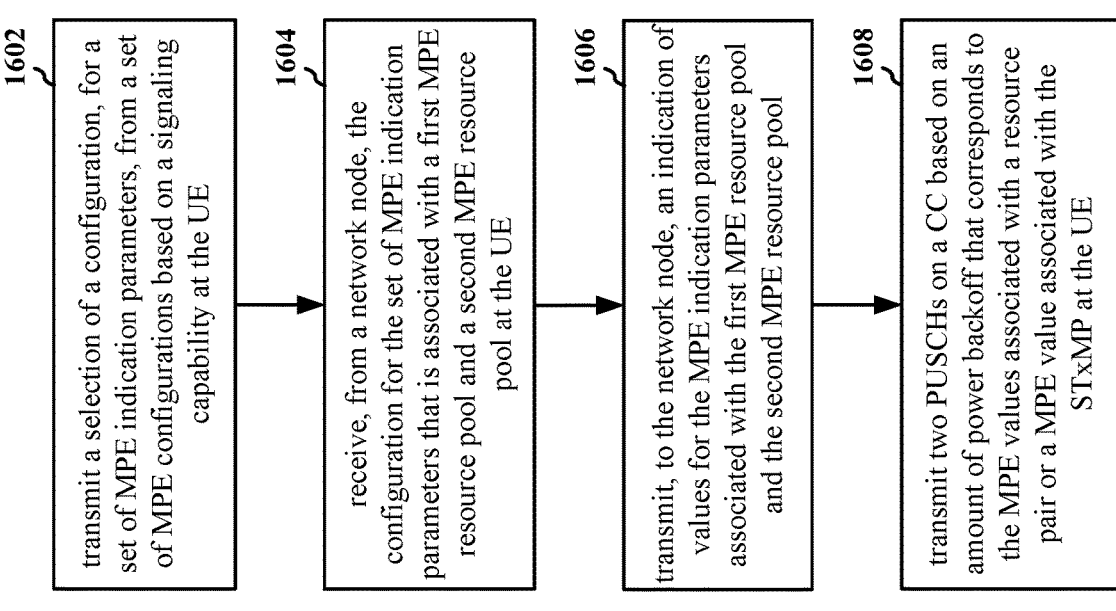

1602 transmit a selection of a configuration, for a set of MPE indication parameters, from a set of MPE configurations based on a signaling capability at the UE

1604 receive, from a network node, the configuration for the set of MPE indication parameters that is associated with a first MPE resource pool and a second MPE resource pool at the UE

1606 transmit, to the network node, an indication of values for the MPE indication parameters associated with the first MPE resource pool and the second MPE resource pool

1608 transmit two PUSCHs on a CC based on an amount of power backoff that corresponds to the MPE values associated with a resource pair or a MPE value associated with the STxMP at the UE

1702 provide, for a UE, a configuration for one or more simultaneous UL transmissions on a CC

1704 receive, from the UE and in response to at least one PHR transmission condition, an indication that corresponds to two MPE values associated with at least two SRS resource sets, respectively, for the one or more simultaneous UL transmissions on the CC

1800

1802 providing, for a UE, a configuration for a set of MPE indication parameters that is associated with two MPE resource pools at the UE

1804 receive, from the UE, an indication of values for a first subset and a second subset of the MPE indication parameters, wherein the first subset and the second subset are respectively associated with the two MPE resource pools

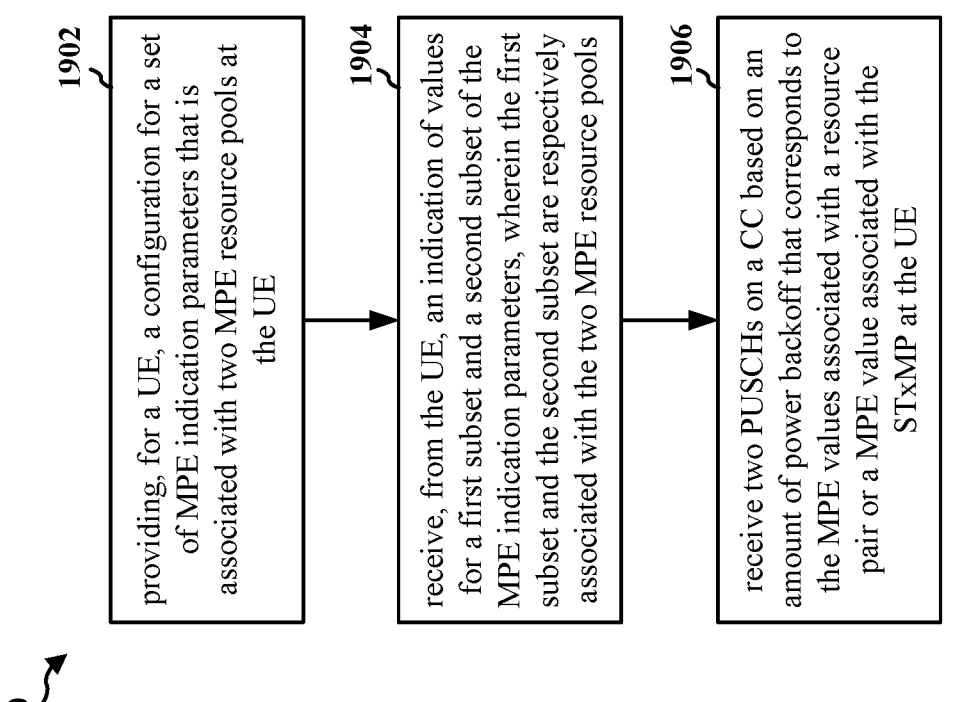

1900

1902 providing, for a UE, a configuration for a set of MPE indication parameters that is associated with two MPE resource pools at the UE

1904 receive, from the UE, an indication of values for a first subset and a second subset of the MPE indication parameters, wherein the first subset and the second subset are respectively associated with the two MPE resource pools

1906 receive two PUSCHs on a CC based on an amount of power backoff that corresponds to the MPE values associated with a resource pair or a MPE value associated with the STxMP at the UE

FIG. 19

JOINT MPE REPORT FOR SINGLE-PANEL AND MULTI-PANEL TRANSMISSIONS

TECHNICAL FIELD

The present disclosure relates generally to communication systems, and more particularly, to wireless communications with maximum permissible exposure (MPE) reporting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In the aspect, the apparatus is configured to receive, from a network node, a configuration for one or more simultaneous uplink (UL) transmissions on a component carrier (CC). The apparatus is also configured to transmit, to the network node and in response to at least one power headroom report (PHR) transmission condition, an indication that corresponds to two maximum permissible exposure (MPE) values associated with at least two sounding reference signal (SRS) resource sets, respectively, for the one or more simultaneous UL transmissions on the CC.

In an aspect of the disclosure, a method, a computer-readable medium, and an apparatus are provided. In the aspect, the apparatus is configured to receive, from a network node, a configuration for a set of maximum permissible exposure (MPE) indication parameters that is associated with a first MPE resource pool and a second MPE resource pool at the UE. The apparatus is also configured to transmit, to the network node, an indication of values for the set of MPE indication parameters associated with the first MPE resource pool and the second MPE resource pool.

In an aspect of the disclosure, a method, a computer-readable medium, and an apparatus are provided. In the aspect, the apparatus is configured to provide, for a user equipment (UE), a configuration for one or more simultaneous uplink (UL) transmissions on a component carrier (CC). The apparatus is also configured to receive, from the UE and in response to at least one power headroom report (PHR) transmission condition, an indication that corresponds to two maximum permissible exposure (MPE) values associated with at least two sounding reference signal (SRS) resource sets, respectively, for the one or more simultaneous UL transmissions on the CC.

In an aspect of the disclosure, a method, a computer-readable medium, and an apparatus are provided. In the aspect, the apparatus is configured to provide, for a user equipment (UE), a configuration for a set of maximum permissible exposure (MPE) indication parameters that is associated with two MPE resource pools at the UE. The apparatus is also configured to receive, from the UE, an indication of values for a first subset and a second subset of the set of MPE indication parameters, where the first subset and the second subset are respectively associated with the two MPE resource pools.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating example configurations for a power headroom report (PHR), in accordance with various aspects of the present disclosure.

FIG. 8 is a diagram illustrating example configurations for joint MPE reporting, in accordance with various aspects of the present disclosure.

FIG. 16 is a flowchart of a method of wireless communication, in accordance with various aspects of the present disclosure.

FIG. 19 is a flowchart of a method of wireless communication, in accordance with various aspects of the present disclosure.

DETAILED DESCRIPTION

Figure 1:
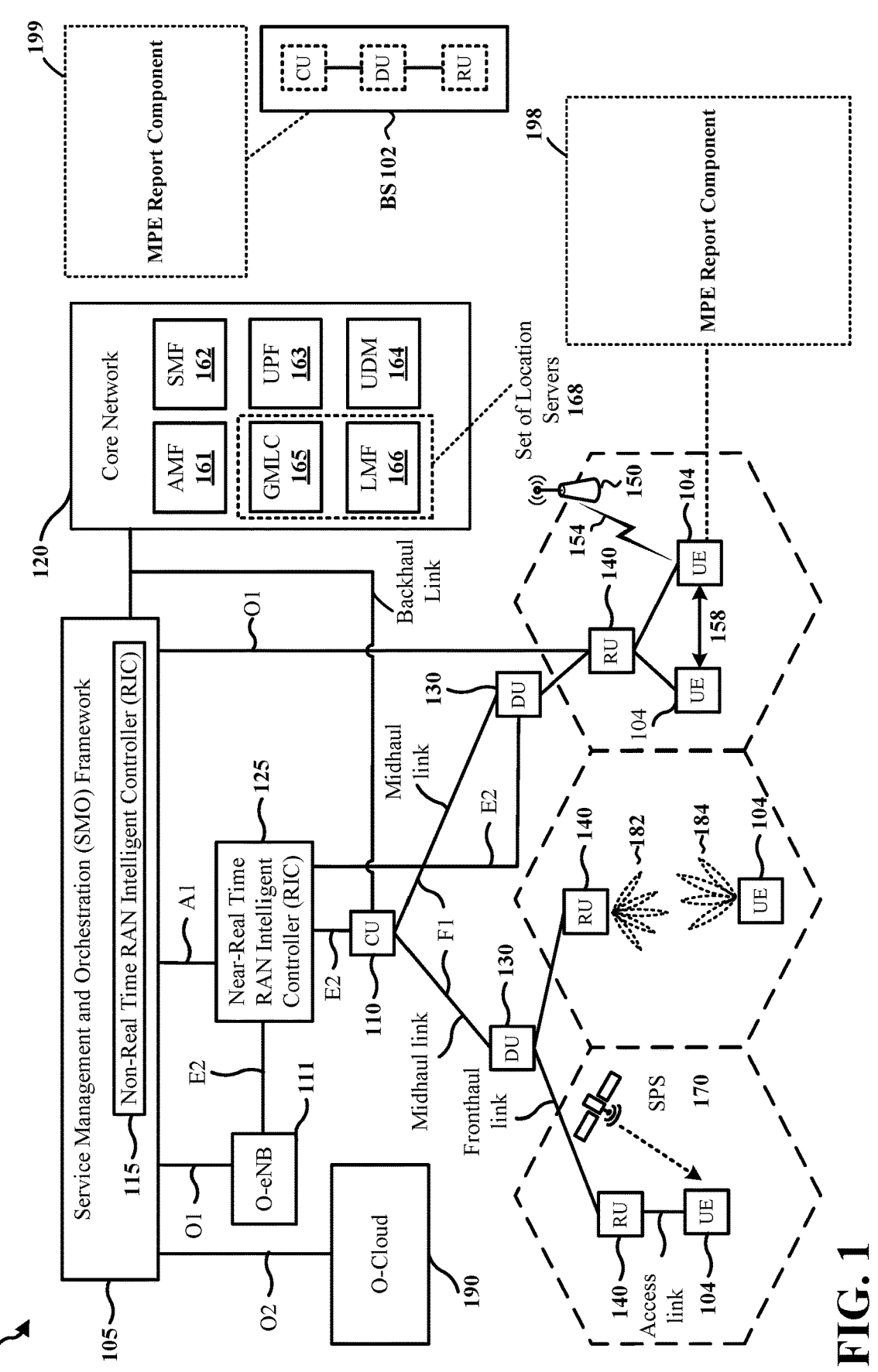
FIG. 1 is a diagram illustrating an example of a wireless communications system and an access network.

Wireless communication networks may be designed for transmission signaling from a user equipment (UE) via two different maximum permissible exposure (MPE) resource pools. For example, resource pools may correspond to different sounding reference signal (SRS) resource sets, transmission configuration indication (TCI) states, UE panel identifiers, transmit receive point (TRP) identifiers, etc., which may be configured for power headroom report (PHR) and MPE value reporting. PHR configurations lack joint MPE reporting options by which single-transmission and dual-transmission MPE values for resources may be reported, and therefore, PHRs based on one or more MPE resource pools are not useful for both single-panel transmissions and multi-panel/simultaneous transmissions. Additionally, for a given transmission beam (e.g., a given resource in a resource pool), the MPE value may be different with and without a simultaneous transmission across multiple panels (STxMP) assumption, and thus, the network may be aware of MPE values for one mode and not the other. Aspects herein provide improvements for MPE value reporting, e.g., via PHRs, by enabling a UE to jointly report MPE values for single-transmission and multi-panel/simultaneous transmissions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a MPE report component 198 ("component 198") that is configured to receive, from a network node, a configuration for one or more simultaneous uplink (UL) transmissions on a component carrier (CC). In such aspects, the MPE report component 198 is also configured to transmit, to the network node and in response to at least one power headroom report (PHR) transmission condition, an indication that corresponds to two maximum permissible exposure (MPE) values associated with at least two sounding reference signal (SRS) resource sets, respectively, for the one or more simultaneous UL transmissions on the CC. In certain aspects, the MPE report component 198 is configured to receive, from a network node, a configuration for a set of maximum permissible exposure (MPE) indication parameters that is associated with a first MPE resource pool and a second MPE resource pool at the UE. In such aspects, the MPE report component 198 is also configured to transmit, to the network node, an indication of values for the set of MPE indication parameters associated with the first MPE resource pool and the second MPE resource pool. In certain aspects, the base station 102 may include a MPE report component 199 ("component 199") that is configured to provide, for a user equipment (UE), a configuration for one or more simultaneous uplink (UL) transmissions on a component carrier (CC). In such aspects, the MPE report component 199 is also configured to receive, from the UE and in response to at least one power headroom report (PHR) transmission condition, an indication that corresponds to two maximum permissible exposure (MPE) values associated with at least two sounding reference signal (SRS) resource sets, respectively, for the one or more simultaneous UL transmissions on the CC. In certain aspects, the MPE report component 199 is configured to provide, for a user equipment (UE), a configuration for a set of maximum permissible exposure (MPE) indication parameters that is associated with two MPE resource pools at the UE. In such aspects, the MPE report component 199 is also configured to receive, from the UE, an indication of values for a first subset and a second subset of the set of MPE indication parameters, where the first subset and the second subset are respectively associated with the two MPE resource pools. Although the following description may be focused on 5G NR, the concepts described herein may be applicable to other similar areas, such as LTE, LTE-A, CDMA, GSM, and other wireless technologies.

Figures 2A, 2B, 2C, 2D:
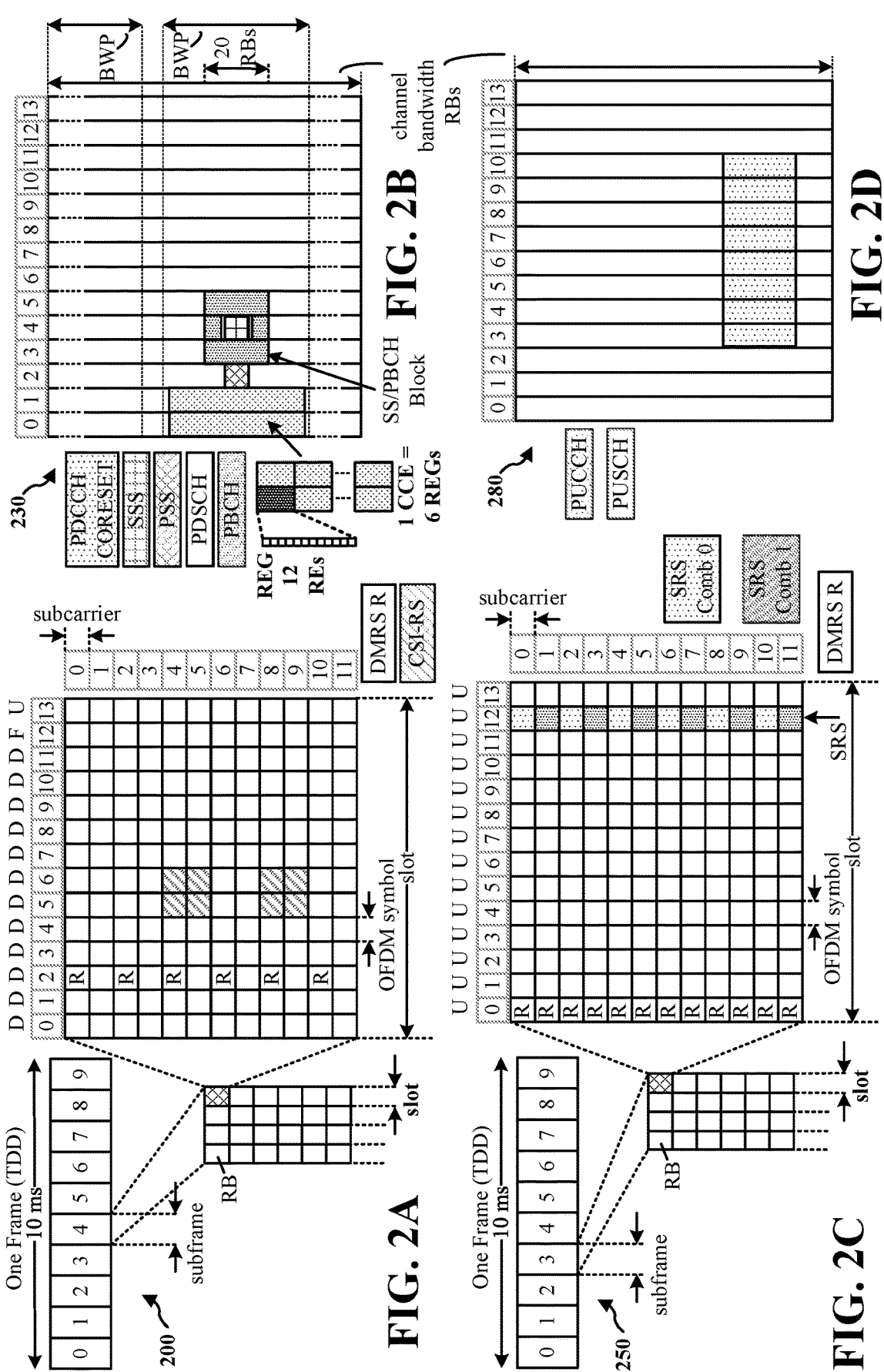
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| | Numerology, SCS, and CP | |
| μ | SCS Δf = 2$^\mu$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and 2$^\mu$ slots/subframe. The subcarrier spacing may be equal to 2*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
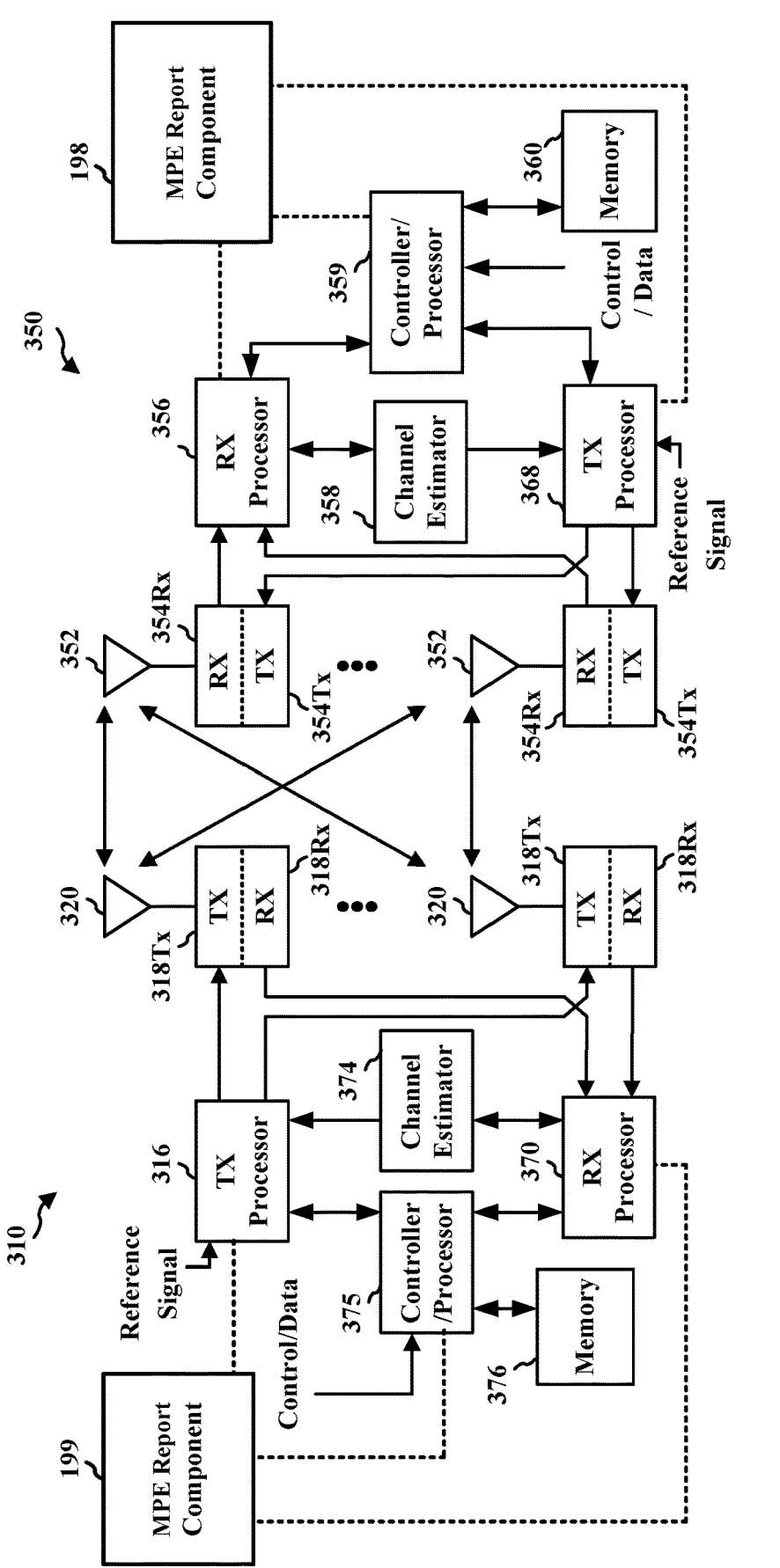
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the MPE report component 198 of FIG. 1. At least one of the TX processor 316, the RX processor 370, and the controller/processor 375 may be configured to perform aspects in connection with the MPE report component 199 of FIG. 1.

Wireless communication networks, such as a 5G NR network, may be designed for transmission signaling from UE via two different MPE resource pools. For example, resource pools may correspond to different SRS resource sets, transmission configuration indication (TCI) states, UE panel identifiers, TRP identifiers, etc., which may be configured for PHR and MPE value reporting. A UE may report a number of transmit beams and corresponding MPE values from a first resource pool, and a number of transmit beams and corresponding MPE values from a second resource pool. Similarly, a UE may report a number of beam pairs, and corresponding pairs of MPE values therefor, where each pair corresponds to a resource in the first resource pool and to another resource in the second resource pool. Yet, even when a second resource pool is not configured at a UE, the UE may benefit from reporting two MPE values that correspond to two TCI states, transmit beams, SRS resource sets, etc., for one transmitted PUSCH (e.g., SDM/SFN PUSCH schemes) or two transmitted PUSCHs (e.g., via multi-DCI) in a CC, where the reported MPE values are for the actual, transmitted PUSCH(s), and not resource pool configurations or candidate transmit beams. However, existing PHR configurations lack joint MPE reporting options by which single- and dual-transmission MPE values for resources may be reported, and therefore, PHRs based on one or more MPE resource pools are not useful for both single-panel transmissions and multi-panel/simultaneous transmissions. For instance, a network node (e.g., a base station, gNB, etc.) may not always schedule via DCIs for simultaneous transmission across multiple panels (STxMP) and may instead dynamically switch between modes for single-panel transmissions and multi-panel/simultaneous transmissions based on resource availability, inter-beam interference, etc. Additionally, for a given beam (e.g., a given resource in a resource pool corresponding to a SSB or CSI-RS resource), the MPE value may be different with and without a STxMP assumption, and thus, the network may be aware of MPE values for one mode and not the other.

A PHR may be triggered by MAC layer and may depends on one or more PHR transmission conditions/triggers. For instance, PHR transmission conditions/triggers may include a set of timers (e.g., a "phr-PeriodicTimer," a "phr-Prohibit-Timer," etc.), a power change larger than a configurable threshold for a power lock reference signal (PL-RS) used for power control in any UL CC, an activation of a secondary cell (Scell), an active BWP of a configured CC that is changed from dormant to non-dormant, and/or the like. When triggered, a PHR may be reported in the PHR MAC control element (MAC-CE) on a first available PUSCH corresponding to an initial transmission of a TB that can accommodate the MAC-CE as a result of logical channel prioritization (LCP). The PUSCH may be dynamic (e.g., scheduled by a DCI), or may be a configured grant (CG) that is triggered via activation DCI. When a UE is configured with multiple CCs for PUSCH transmission, the PHR MAC-CE may include a PHR report for more than one CC (e.g., when "multiplePHR" is enabled via RRC). Otherwise, the PHR may be reported for the primary cell (Pcell) and a single-entry MAC-CE format may be used. When a first PUSCH in a first CC carries the PHR MAC-CE, for a second CC, the MAC-CE may include either actual PHR or a virtual PHR (e.g., based on a reference format) depending on whether there is a PUSCH transmission on the second CC at the time of the PHR being reported (e.g., in the slot of the first PUSCH).

Aspects herein provide improvements for MPE value reporting, e.g., via PHRs, by enabling a UE to jointly report MPE values for single- and multi-panel/simultaneous transmissions. Accordingly, aspects improve reporting capabilities of the UE and reduce overhead and power consumption through such joint reporting (e.g., in a single PHR MAC-CE). For instance, when a UE is configured for multi-panel/simultaneous UL transmissions, e.g., PUSCHs, or for single-panel transmissions, the UE may be configured to report both single-panel and multi-panel/simultaneous transmission MPE values in a joint report, e.g., via indication that corresponds to two MPE values associated with at least two SRS resource sets, respectively, for two UL transmissions on a single CC, where the MPE values may be specific to the actual UL transmissions. Likewise, a UE may be configured to receive a configuration for a set of MPE indication parameters that is associated with a first MPE resource pool and a second MPE resource pool at the UE, and to transmit, to a network node, an indication of values for the set of MPE indication parameters associated with the first MPE resource pool and the second MPE resource pool.

Referring now to FIG. 4, a diagram 400 is shown that illustrates example configurations for a PHR, in various aspects. The PHR illustrated may be for a PHR MAC-CE. A PHR MAC-CE may include a field(s) 402 that indicates an applied power backoff the meet MPE requirements for FR2. A MAC entity may set the P field(s) to 1 if the corresponding $P_{CMAX,f,c}$ field (e.g., for a UE-configured maximum transmit power) would have had a different value if no power backoff due to power management had been applied. That is, in FR2, if P=1, this field may indicate the applied power backoff to meet MPE requirements (e.g., if "mpe-Reporting-FR2" is configured). As illustrated, A PHR MAC-CE may be utilized for a single MPE value for one UL transmission, or may be utilized for multiple UL transmissions.

Figure 5:
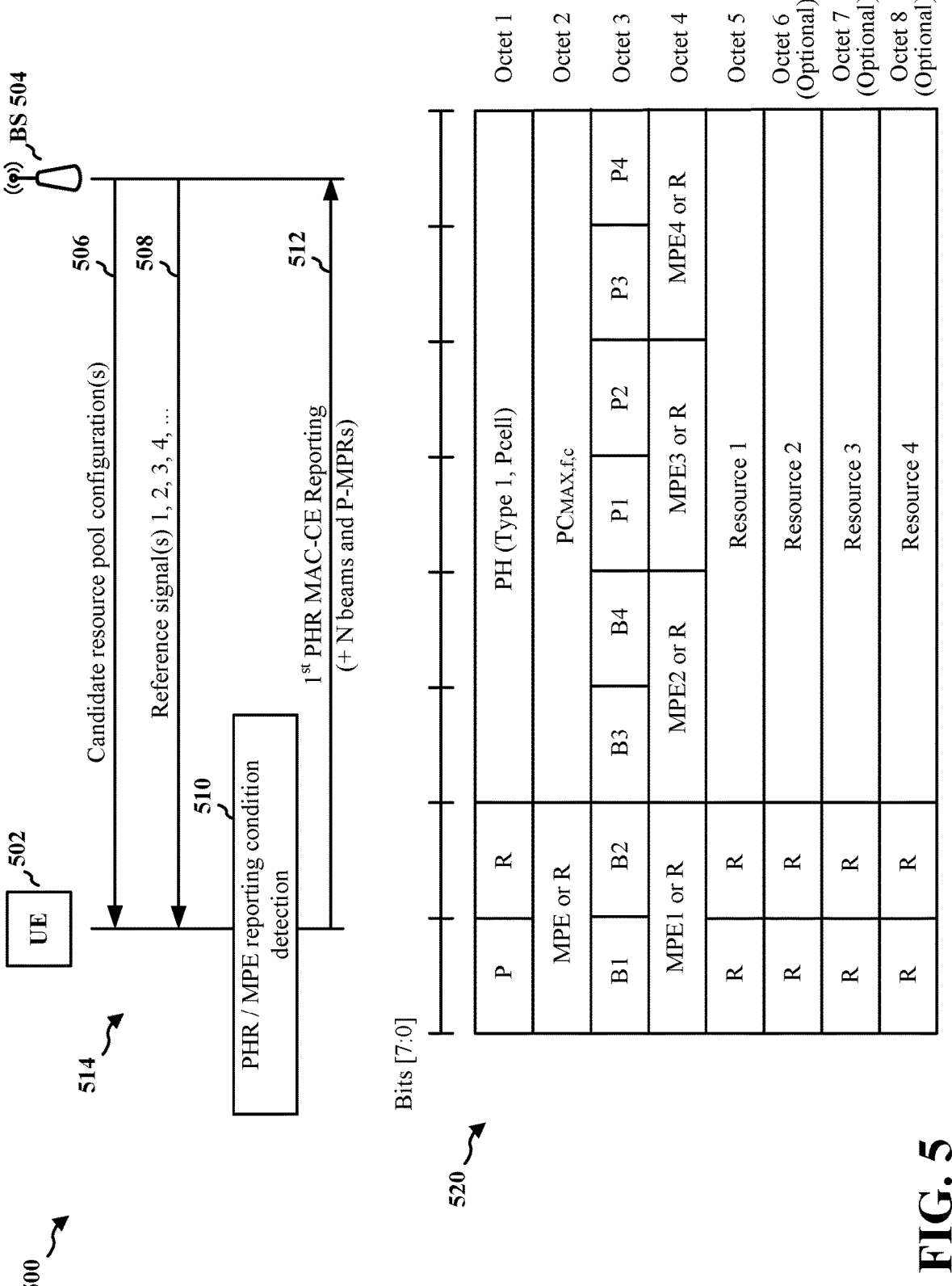
FIG. 5 is a diagram illustrating example configurations for maximum permissible exposure (MPE) in a power headroom report (PHR), in accordance with various aspects of the present disclosure.

FIG. 5 is a diagram 500 illustrating example configurations for maximum permissible exposure (MPE) in a power headroom report (PHR), in various aspects. Diagram 500 includes a call flow diagram 514 portion showing a PHR/MPE MAC-CE between a UE 502 and a base station 504. The base station 504 may provide the UE 502 with a candidate resource pool configuration 506. The base station 504 may transmit one or more reference signals 508 to the UE 502. The UE 502 may determine (at 510) whether a PHR/MPE reporting condition/trigger has been detected. The PHR/MPE MAC-CE may be triggered when a power management maximum power reduction (P-MPR) of a current uplink beam exceeds (or meets) a threshold. The UE 502 may transmit a first PHR MAC-CE 512. The first PHR MAC-CE 512 may report N P-MPR values associated with N uplink beams. For each of the N P-MPR values, the UE 502 may also report a corresponding resource indicator selected from a RRC configured candidate resource pool. In some aspects, the UE 502 may support N=1, 2, 3, or 4. A largest N value supported by the UE 502 may be based on a UE capability. An RRC configured resource pool (e.g., "mpe-ResourcePool") may include a list of up to 64 resources out of which the UE reports up to N resources.

A configuration 520 of FIG. 5 illustrates an example of a MPE report. Bk (e.g., B1, B2, B3, B4) may indicate whether a candidate beam information identified by a Resourcek (e.g., Resource1, Resource2, Resource3, Resource4) is present or not (e.g., may indicate the candidate beam identified by the number of entries in the corresponding "mpe-ResourcePoolToAddModList"). MPEk (e.g., MPE1, MPE2, MPE3, MPE4) may indicate the applied power backoff to meet MPE requirements (e.g., if the corresponding Pk (e.g., P1, P2, P3, P4) is set to 1). Pk may be set to 0 in instances where the applied P-MPR value is less than a threshold. Resource1 may indicate the first resource associated with an UL beam for which the MPE is reported within the MPE report. The MPE configuration (e.g., "MPE-Config-FR2") may include an integer value between 1-4 for a number of N resources (e.g., "numberOfN"), as well as a resource pool (e.g., "mpe-ResourcePool") that may be based on a size of maximum MPE resources (e.g., "maxMPE-Resources", "MPE-Resource").

In instances of simultaneous PUSCH transmissions, such as SDM/FDM PUSCH for single-DCI, two fully or partially PUSCHs overlapping in the time domain for multi-DCI, the UE may use two panels in frequency range 2 (FR2). The MPE value may be different on different panels. The MPE resource pool may be separately configured for separates MPE reports associated with different UE panels. A UE capability for a maximum number of reported MPE values or resource indicators may be on a per panel basis or across both panels. In instances of multi-DCI based mTRP, where a UE is configured with two coresetPoolIndex values, the UE may be configured with separate or joint PHR triggering and reporting. Separate PHR triggering and reporting may be more suitable for non-ideal backhaul between TRPs, while joint PHR triggering and reporting may be more suitable in instances of good backhaul between TRPs.

Aspects presented herein provide a configuration for the reporting of PHR for simultaneous transmission as well as single-panel transmissions. The aspects presented herein may allow a UE to report a PHR associated with a first resource pool or a second resource pool. In some aspects, the UE may be configured to report the PHR including a resource associated with the first resource pool or an resource associated with the second resource pool. In some aspects, the UE may be configured to report the PHR associated with the first resource pool or the second resource pool separately or jointly via a single configuration for reporting.

A UE may be configured with simultaneous transmissions in one CC may be configured with two separate MPE resource pools, were each resource pool corresponds to an SRS resource set, coresetPoolIndex value, UE panel identifier (ID), TRP identifier. Each resource pool may be configured with a list of resources indices or resource IDs. In some instances, a maximum number of resources per resource pool that may be supported by the UE may be indicated within a UE capability. In some instances, a PHR may include N1 resources and corresponding MPE values from the first MPE resource pool, and N2 resources and corresponding MPE values from the second MPE resource pool. A field in the PHR MAC-CE may indicate whether a reported resources, and corresponding MPE value, may be associated with the first resource pool or the second resource pool. The UE capability may be configured to indicate a maximum value of supported N1, N2, or N1+N2. For example, the UE may be configured to support the maximum number of N1 and the maximum number of N2. In some aspects, the UE may be configured to support the maximum number of N1+N2. The UE may indicate that the UE may support the maximum number of N1, the maximum number of N2, or both the maximum number of N1 and the maximum number of N2. The UE may indicate which of the at least one of N1, N2, or N1+N2 is supported in a UE capability report to the base station. The value of N1 or N2 may be configured via RRC signaling to the UE from the base station. In some instances, N1=N2=N, such that the UE may report N pairs of resources and N corresponding pairs of MPE value. This may serve as an indication that UE may transmit two uplink beams corresponding to the pair simultaneously. This may be indicated based on these two are reported as a pair or are associated with each other. A first resource of each pair may be selected from the first resource pool and may be associated with at least one of the first SRS resource set, coresetPoolIndex value, a UE panel ID, a TRP ID, or the second resource of the pair selected from the second resource pool and associated with at least one of the second SRS resource set, coresetPoolIndex value, a UE panel ID, or a TRP ID.

Figure 6:
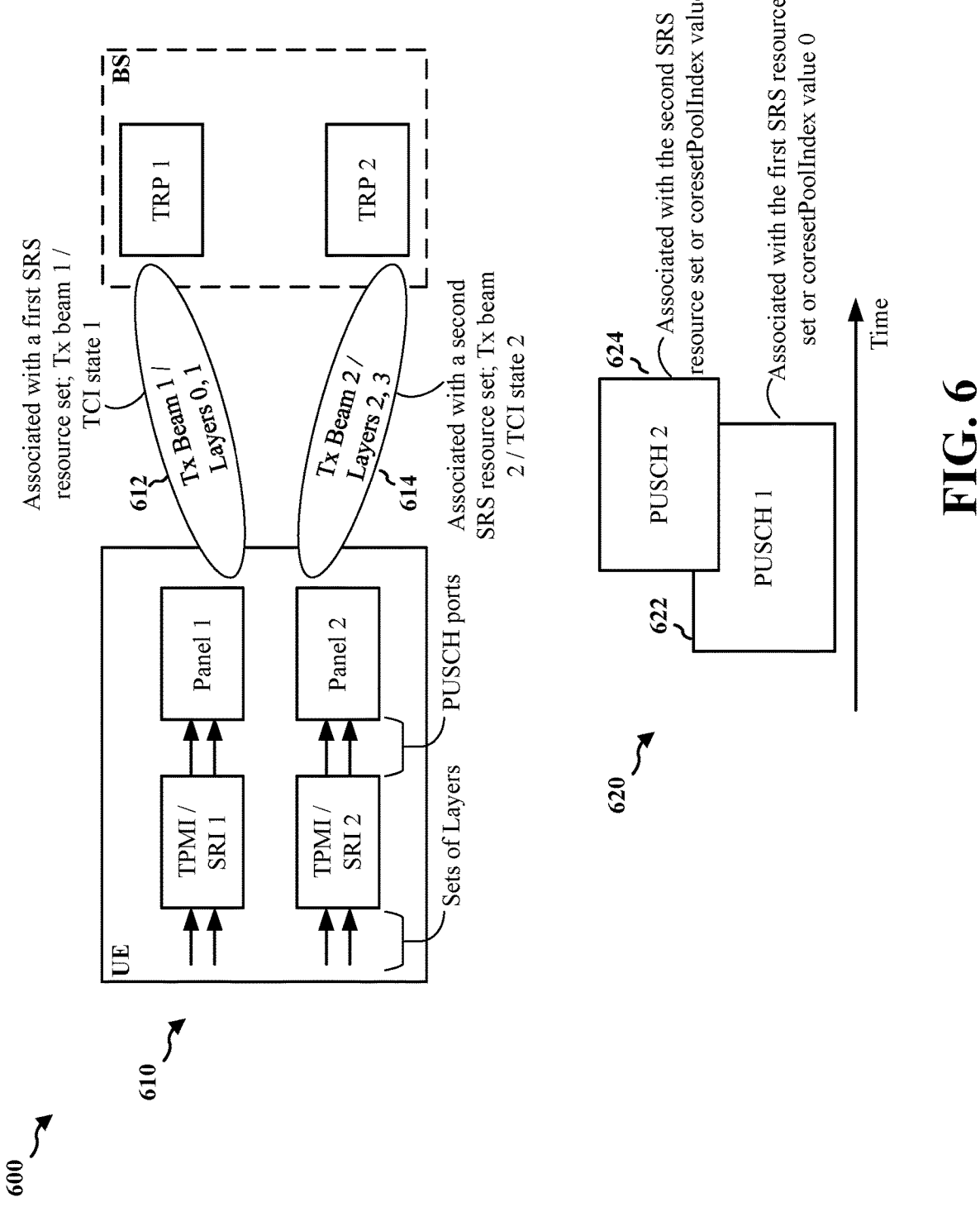
FIG. 6 is a diagram illustrating example simultaneous transmissions at a user equipment (UE), in accordance with various aspects of the present disclosure.

FIG. 6 is a diagram 600 illustrating example simultaneous transmissions at a user equipment (UE), in various aspects. In some instances, such as a single DCI based spatial division multiplex (SDM) PUSCH, a single DCI may schedule a PUSCH with two sets of demodulation reference signal (DMRS) ports, layers transmitted from two panels with different transmission beams, precoders, or power control parameters. Two sets of layers may be associated with two SRS resource sets, as shown in diagram 600 for configuration 610. For example, a first layer 612 may be associated with the first SRS resource set having a first transmission beam and a first TCI state. A second layer 614 may be associated with the first SRS resource set having a second transmission beam and a second TCI state. The DCI may include an SRS resource set indicator field, two SRI fields, and two transmit precoder matrix index (TPMI) fields. Such a single DCI schedules a PUSCH with two sets of DMRS ports/layers transmitted from two panels with different Tx beams/precoders/power control parameters/etc., where the two sets of layers may be associated with 2 SRS resource sets, and rank combinations may be: 1+1, 1+2, 2+1, 2+2 layers.

In instances of PUSCHs overlapping in the time domain, as shown for example in configuration 620 of FIG. 6, two different PUSCHs (e.g., a PUSCH1 622, a PUSCH2 624) in the same serving cell or CC may be partially or fully overlapping in at least the time domain (while frequency domain overlapping may or may not occur). The PUSCH1 622 and PUSCH2 624 may or may not overlap in the frequency domain. This may be enabled by a multi-DCI based mTRP framework, where the two PUSCHs may be associated with different coresetPoolIndex values, which may be distinct than SDM/FDM PUSCH with single DCI based framework, where simultaneous transmission is within a single PUSCH. In some instances, the PUSCH1 622 may be associated with a coresetPoolIndex value of 0 and may be associated with the first SRS resource set, such that the PUSCH1 622 is transmitted using a first beam, a first TCI state, first power control parameters, or a first precoder. The PUSCH2 624 may be associated with a coresetPoolIndex value of 1 and may be associated with the second SRS resource set, such that the PUSCH2 624 is transmitted using a second beam, a second TCI state, second power control parameters, or a second precoder.

Figure 7:
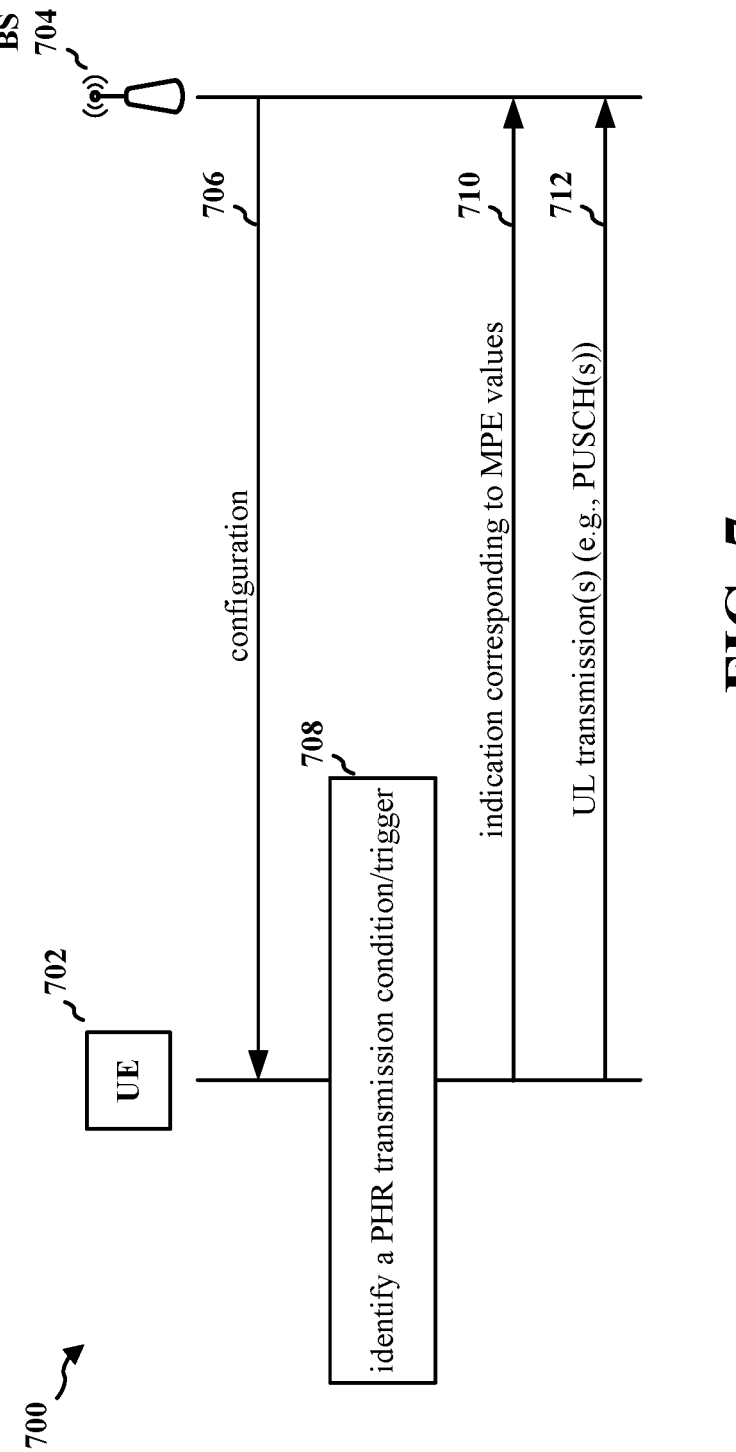
FIG. 7 is a call flow diagram for wireless communications, in accordance with various aspects of the present disclosure.

FIG. 7 is a call flow diagram 700 for wireless communications, in various aspects. Call flow diagram 700 illustrates joint MPE reporting for single-panel and multi-panel transmissions at a wireless device (a UE 702, by way of example) for application at a network node (a base station 704, such as a gNB or other type of base station, by way of example, as shown), in various aspects. Aspects described for the base station 704 may be performed by the base station in aggregated form and/or by one or more components of the base station in disaggregated form. Additionally, or alternatively, the aspects may be performed by the UE 702 autonomously, in addition to, and/or in lieu of, operations of the base station 704. The base station 704 may be configured to provide at least one cell.

In the illustrated aspect, the UE 702 may be configured to receive a configuration 706 from the base station 704. For instance, the UE 702 may be configured to receive to the configuration 706 for two UL transmissions (e.g., two PUSCHs) on a CC. The UE 702 may determine (at 708) whether a PHR/MPE reporting condition/trigger has been detected. For example, a PHR/MPE MAC-CE may be triggered when a power management maximum power reduction (P-MPR) of a current UL beam exceeds (or meets) a threshold. In aspects, the UE 702 may determine (at 708) that the PHR/MPE reporting condition/trigger has been detected by being configured to measure one or more resources within the first resource pool and the second resource pool based on a configuration for the first and second resource pools received from the base station 704.

The UE 702 may be configured to transmit an indication 710 that corresponds to MPE values to the base station 704. For example, the UE may be configured, in aspects, to transmit, to the network node and in response to at least one PHR transmission condition (at 708), the indication 710 that corresponds to two MPE values associated with at least two SRS resource sets, respectively, for one or more simultaneous UL transmissions on the CC. In aspects, the one or more simultaneous UL transmissions on the CC may be PUSCH transmissions, and the indication 710 may be included in a PHR. In one configuration, the UE may be configured to transmit the PHR via a MAC-CE (e.g., PHR/MPE MAC-CE). In aspects, the indication 710 may include at least a respective MPE value and a maximum power value for each of the two MPE values identified as being present via the indication 710.

In one configuration, the two MPE values may be identified as being present via the indication 710, and the two MPE values may correspond to a single PUSCH associated with two TCI states and scheduled based on a single DCI for SDM.

In one configuration, the two MPE values may be identified as being present via the indication 710, and the two MPE values may correspond to two PUSCHs, each associated with a different SRS resource set of the at least two SRS resource sets, that are scheduled based on respective DCI for STxMP. In such a configuration, the indication 710 may further indicate that the two PUSCHs are transmitted at least partially simultaneously in time.

In one configuration, the indication 710 may be a PHR that may be transmitted by the UE 702 via a MAC-CE, and the PHR may indicate a first of the two MPE values as being present and include a first MPE value and an associated first maximum power value, and may indicate a second of the two MPE values as being absent and exclude a second MPE value and an associated second maximum power value.

That is, the UE 702 may be configured with simultaneous transmissions in one CC, and is enabled, in aspects, to report two MPE values (and two corresponding $P_{CMAX,f,c}$ values) associated with two TCI states/beams/SRS resource sets/ etc., for one or more transmitted PUSCHs in the CC through the indication 710 (e.g., transmitted from the UE 702 and received by the base station 704).

Subsequent to the indication 710, the UE 702 may be configured to transmit one or more UL transmissions 712, e.g., PUSCH(s), to be received by the base station 704. In aspects, the UE 702 may be configured to transmit one or more UL transmissions 712 based on the MPE values, e.g., with an applied power backoff to meet MPE requirements according to the MPE values associated with the indication 710.

FIG. 8 is a diagram 800 illustrating example configurations for joint MPE reporting, in various aspects. For example, a configuration 802, a configuration 810, and a configuration 820 are shown.

In the illustrated aspect, the configuration 802 includes MPE indication parameters P1, P2, which may indication the presence of respective MPE values MPE1 and MPE2. That is, by way of example and with reference back to call flow diagram 700 of FIG. 7, when P1 and/or P2 are set (e.g., are one "1"), MPE1 and/or MPE2 values may be present, respectively. As also illustrated and described for call flow diagram 700, a present MPE1 value or MPE2 value may be accompanied by corresponding $P_{CMAX,f,c}$ values (e.g., $P_{CMAX,f,c,1}$, $P_{CMAX,f,c,2}$). In aspects, when P1 and/or P2 are not set (e.g., are zero "0"), an associated MPE1 value or MPE2 value, and the corresponding $P_{CMAX,f,c}$ value(s) (e.g., $P_{CMAX,f,c,1}$, $P_{CMAX,f,c,2}$), may not be reported.

Additionally, the configuration 810 shows a PUSCH 812 that may be transmitted according to SDM/SFN, e.g., as a single PUSCH associated with two TCI states and scheduled based on a single DCI, as described for call flow diagram 700, for which the configuration 802 may be applicable for MPE value reporting as noted above. Similarly, the configuration 820 shows a PUSCH1 822 and a PUSCH2 824 that may be transmitted as two separate PUSCHs, each associated with a different SRS resource set of the at least two SRS resource sets, that are scheduled based on respective DCI for STxMP (e.g., at least partially simultaneously in time), as described for call flow diagram 700, for which the configuration 802 may also be applicable for MPE value reporting as noted above.

Figure 9:
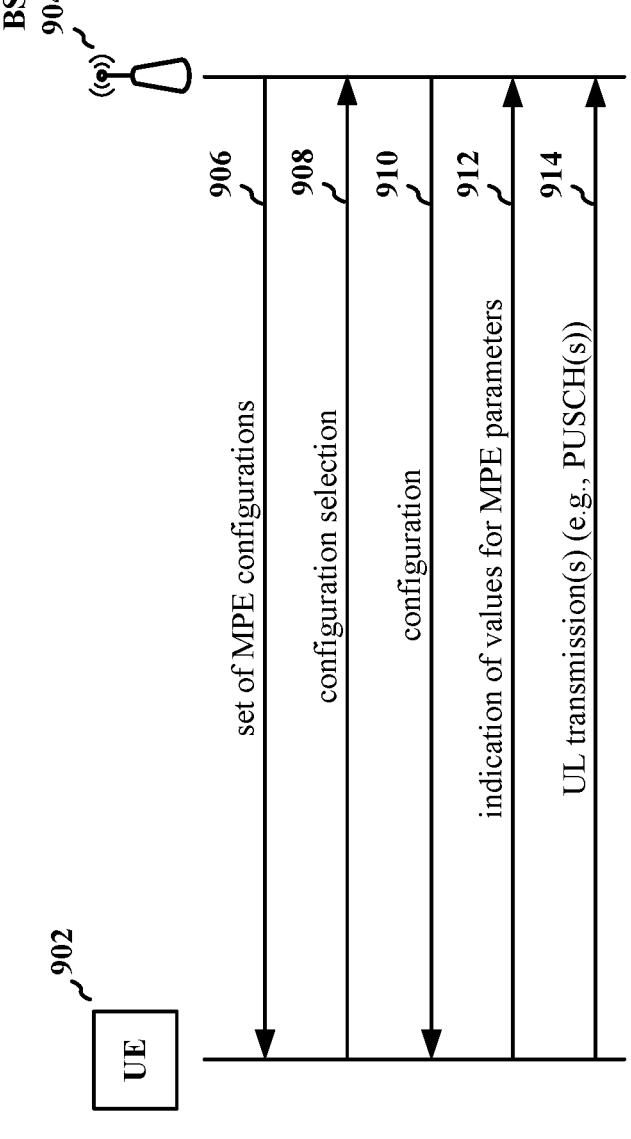
FIG. 9 is a call flow diagram for wireless communications, in accordance with various aspects of the present disclosure.

FIG. 9 is a call flow diagram 900 for wireless communications, in various aspects. Call flow diagram 900 illustrates joint MPE reporting for single-panel and multi-panel transmissions at a wireless device (a UE 902, by way of example) for application at a network node (a base station 904, such as a gNB or other type of base station, by way of example, as shown), in various aspects. Aspects described for the base station 904 may be performed by the base station in aggregated form and/or by one or more components of the base station in disaggregated form. Additionally, or alternatively, the aspects may be performed by the UE 902 autonomously, in addition to, and/or in lieu of, operations of the base station 904. The base station 904 may be configured to provide at least one cell.

In the illustrated aspect, the UE 902 may be configured to receive a set of configurations 906 for MPE reporting from the base station 904. For instance, the UE 902 may be configured to receive one or more configurations for MPE reporting. Examples of such configurations are described in further detail below with respect to FIGS. 10-13. The UE 902 may then be configured to transmit a configuration selection 908 to be received by the base station 904, in aspects. The configuration selection 908 may include one configuration from the set of configurations 906 for MPE. That is, the UE 902 may be configured to transmit, to be received by the base station 904, a selection of the configuration for the set of MPE indication parameters, prior to its reception by the UE 902, from a set of configurations 906 for MPE.

The UE 902 may be further configured to receive a configuration 910 that is provided by the base station 904. For example, the UE 902 may be further configured to receive the configuration 910 for a set of MPE indication parameters that is associated with a first MPE resource pool and a second MPE resource pool at the UE. The UE 902 may be configured to transmit, to be received by the base station 904, an indication 912 of values for MPE parameters. For example, the UE 902 may be configured to transmit, to the base station 904, the indication 912 of values for the set of MPE indication parameters associated with the first MPE resource pool and the second MPE resource pool. In aspects, the indication 912 of values may be a PHR/MPE MAC-CE.

Subsequent to the indication 912 of values for MPE parameters, the UE 902 may be configured to transmit one or more UL transmissions 914, e.g., PUSCH(s), to be received by the base station 904. In aspects, the UE 902 may be configured to transmit one or more UL transmissions 914 based on the values for MPE parameters in the indication 912 (such as MPE values), e.g., with an applied power backoff to meet MPE requirements according to such MPE values associated with the indication 912.

Figure 10:
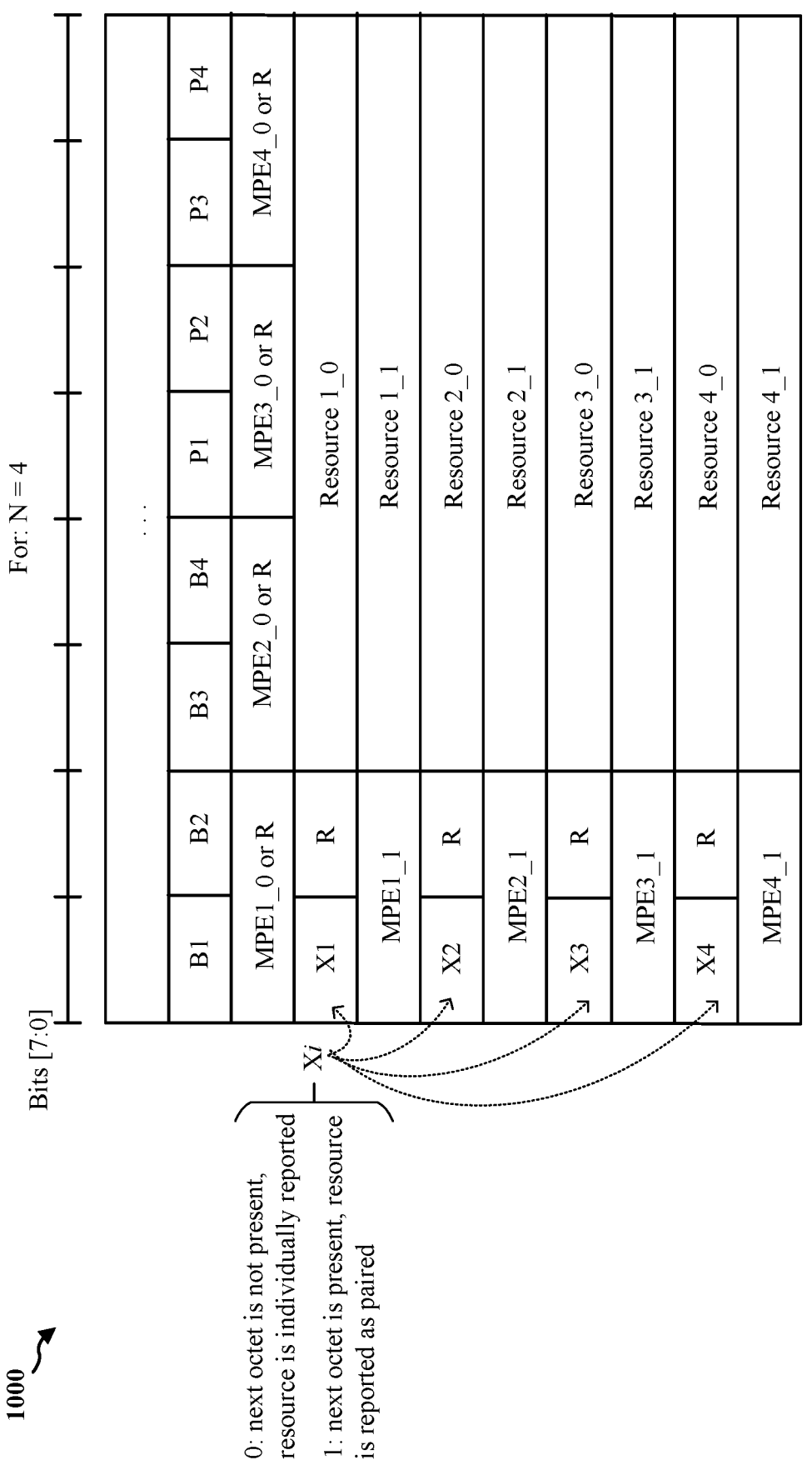
FIG. 10 is a diagram illustrating an example configuration for joint MPE reporting, in accordance with various aspects of the present disclosure.

FIG. 10 is a diagram 1000 illustrating an example configuration for joint MPE reporting, in various aspects. The illustrated configuration includes four resources, e.g., N=4, by way of example and not limitation, and diagram 1000 may be an enhanced aspect of configuration 520 in FIG. 5. In aspects, based on the configuration shown in diagram 1000, a UE may be configured to report N resources or resource pairs (and corresponding MPE values), where the UE may also indicate whether each resource is associated with another resource (as a pair) or not. In such a configuration, the UE may determine and indicate how many pairs and how many individual resources are reported, and thus, the number of reported resources/MPE values may be variable between N (for the case that no pair is reported) and 2N (for the case that no individual resource is reported). Such a configuration may be possible either with one resource pool or with two resource pools, as described herein.

For example, BN (e.g., B1, B2, B3, B4) may indicate whether a candidate beam information identified by a ResourceN_0 (e.g., Resource1_0, Resource2_0, Resource3_0, Resource4_0) is present or not (e.g., may indicate the candidate beam identified by the number of entries in the corresponding "mpe-ResourcePoolToAdd-ModList"). MPEN_0 (e.g., MPE1_0, MPE2_0, MPE3_0, MPE4_0) may indicate the applied power backoff to meet MPE requirements (e.g., if the corresponding PN (e.g., P1, P2, P3, P4) is set to 1). PN may be set to 0 in instances where the applied P-MPR value is less than a threshold. Resource1_0 may indicate the first resource associated with an UL beam for which the MPE1_0 is reported within the MPE report. The MPE configuration (e.g., "MPE-Config-FR2") may include an integer value between 1-4 for a number of N resources (e.g., "numberOfN"), as well as a resource pool (e.g., "mpe-ResourcePool") that may be based on a size of maximum MPE resources (e.g., "maxMPE-Resources", "MPE-Resource"). ResourceN_1 (e.g., Resource1_1, Resource2_1, Resource3_1, Resource4_1) may be included as a pair to a corresponding ResourceN_0, in aspects, as indicated by a MPE parameter Xi (e.g., X1, X2, X3, X4). If a given value of Xi is set to one ("1"), the next octet of MPEN_1 (e.g., MPE1_1, MPE2_1, MPE3_1, MPE4_1) and ResourceN_1 (e.g., Resource1_1, Resource2_1, Resource3_1, Resource4_1) may indicate the applied power backoff to meet MPE requirements for the paired resource. If a given value of Xi is not set to one, but is zero ("0"), the next octet may not be included and the associated ResourceN_1 may be individually reported.

That is, in aspects a subset of the set of MPE indication parameters associated with at least one of the first MPE resource pool or the second MPE resource pool may include at least one of a number of resources or at least one resource pair, and corresponding MPE values, where each of the at least one resource pair may include a first resource of the first MPE resource pool and a second resource of the second MPE resource pool. In one such aspect, each resource of the number of resources may be associated with a pairing indicator, of the set of MPE indication parameters, that identifies a pairing status of the resource with another resource.

Figure 11:
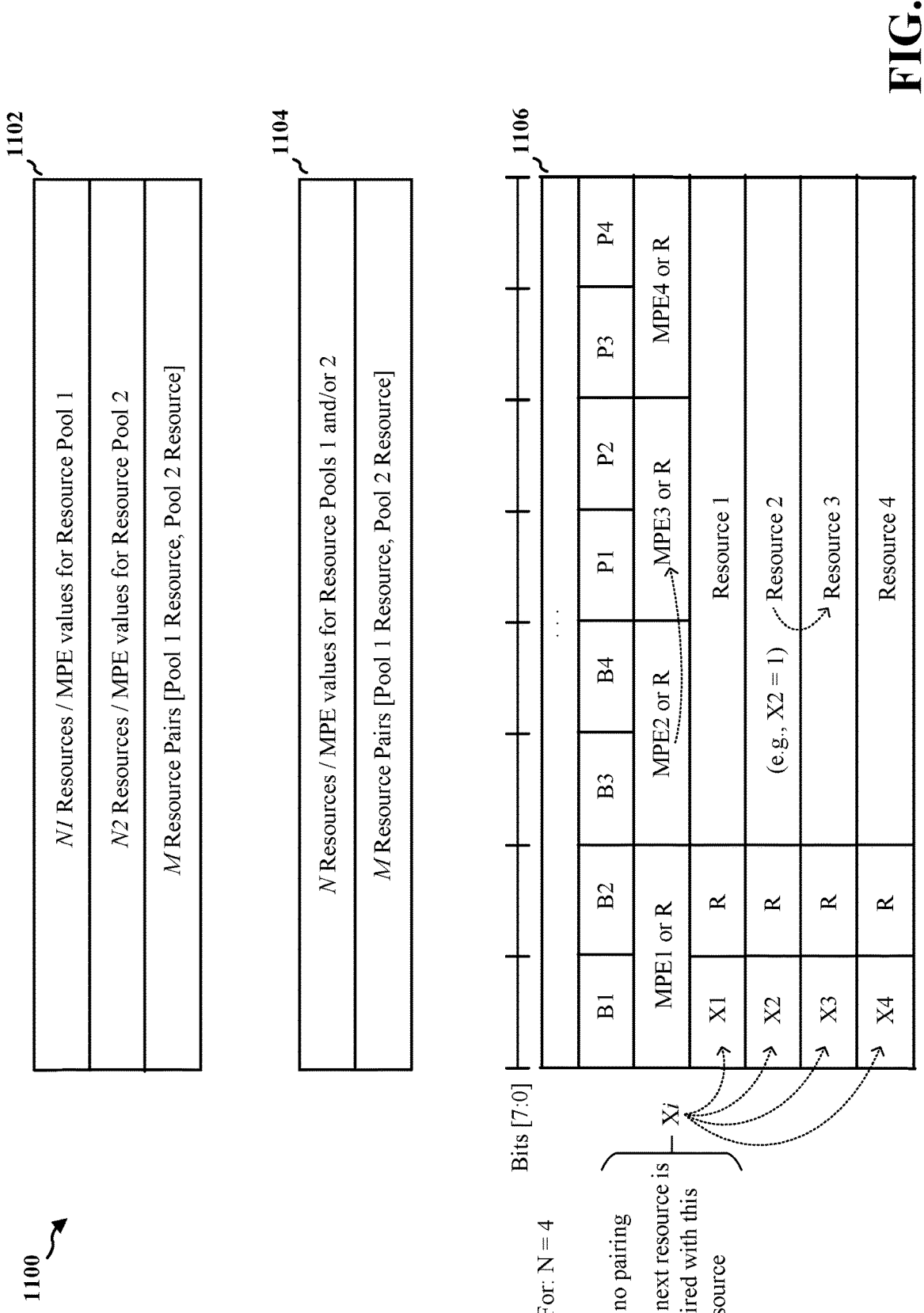
FIG. 11 is a diagram illustrating example configurations for joint MPE reporting, in accordance with various aspects of the present disclosure.

FIG. 11 is a diagram 1100 illustrating example configurations for joint MPE reporting, in various aspects. Diagram 1100 includes a configuration 1102, a configuration 1104, and a configuration 1106.

The configuration 1102 shows that a UE may be configured with N1 resources (and corresponding MPE values) from a first resource pool, and N2 resources (and corresponding MPE values) from a second resource pool. The configuration 1102 also shows that a UE may be configured with M pairs of resources (and corresponding pairs of MPE values), where for each pair, one resource may be selected from the first resource pool and one resource may be selected from the second resource pool. In aspects, a base station may be configured to use the N1+N2 MPE reports for single-panel scheduling with the beams identified by indicated resources and to use the N pairs of MPE reports for STxMP scheduling with beam pairs identified by indicated resource pairs.

That is, in aspects a first subset of the set of MPE indication parameters associated with a first MPE resource pool may include a first number of resources and corresponding first MPE values, a second subset of the set of MPE indication parameters associated with a second MPE resource pool may include a second number of resources and corresponding second MPE values, and the set of MPE indication parameters may include at least one resource pair and at least one corresponding pair of MPE values, where each of the at least one resource pair includes a first resource of the first MPE resource pool and a second resource of the second MPE resource pool. In one such aspect, at least one of the first number of resources and the corresponding MPE values, the second number of resources and the corresponding second MPE values, or the at least one resource pair and the at least one corresponding pair of MPE values may be configured as disabled. In one such aspect, at least one of the first number of resources and the corresponding MPE values or the second number of resources and the corresponding second MPE values may be associated with SDM on a single panel at the UE, or at least one resource pair and at least one corresponding pair of MPE values may be associated with STxMP at the UE.

The configuration 1104 shows that a UE may be configured with N resources (and corresponding MPE values) from the first resource pool and/or from the second resource pool. The configuration 1104 also shows that a UE may be configured with M pairs of resources (and corresponding pairs of MPE values), where for each pair, one resource may be selected from the first resource pool and one resource may be selected from the second resource pool. In aspects, a base station may be configured to use the N MPE reports for single-panel scheduling with the beams identified by indicated resources and to use the N pairs of MPE reports for STxMP scheduling with beam pairs identified by indicated resource pairs.

That is, in aspects a subset of the set of MPE indication parameters associated with at least one of the first MPE resource pool or the second MPE resource pool may include a number of resources and corresponding MPE values, and the set of MPE indication parameters may include at least one resource pair and at least one corresponding pair of MPE values, where each of the at least one resource pair may include a first resource of the first MPE resource pool and a second resource of the second MPE resource pool. In one such aspect, at least one of the number of resources and the corresponding MPE values or the at least one resource pair and the at least one corresponding pair of MPE values may be configured as disabled. In one such aspect, at least one of the first number of resources and the corresponding MPE values or the second number of resources and the corresponding second MPE values may be associated with SDM on a single panel at the UE, or at least one resource pair and at least one corresponding pair of MPE values may be associated with STxMP at the UE.

The illustrated configuration 1106 includes four resources, e.g., N=4, by way of example and not limitation, and the configuration 1106 in diagram 1100 may be an enhanced aspect of configuration 520 in FIG. 5 and/or an alternate aspect of the configuration described above in FIG. 10. In aspects, based on the configuration 1106, a UE may be configured to report N resources (and corresponding MPE values), where the UE may also indicate that two of the resources are a pair associated with STxMP transmission. In such a configuration, the UE may determine and indicate whether a resource is in a pair or is individual, yet this choice may not impact the number of reported resources (and size of the MAC-CE). Such a configuration may be possible either with one resource pool or with two resource pools, as described herein.

For example, BN (e.g., B1, B2, B3, B4) may indicate whether a candidate beam information identified by a ResourceN (e.g., Resource1, Resource2, Resource3, Resource4) is present or not (e.g., may indicate the candidate beam identified by the number of entries in the corresponding "mpe-ResourcePoolToAddModList"). MPEN (e.g., MPE1, MPE2, MPE3, MPE4) may indicate the applied power backoff to meet MPE requirements (e.g., if the corresponding PN (e.g., P1, P2, P3, P4) is set to 1). PN may be set to 0 in instances where the applied P-MPR value is less than a threshold. Resource1 may indicate the first resource associated with an UL beam for which the MPE1 is reported within the MPE report. The MPE configuration (e.g., "MPE-Config-FR2") may include an integer value between 1-4 for a number of N resources (e.g., "numberOfN"), as well as a resource pool (e.g., "mpe-Resource-Pool") that may be based on a size of maximum MPE resources (e.g., "maxMPE-Resources", "MPE-Resource"). A given ResourceN (e.g., Resource2, Resource3, Resource4) may be included as a pair to another, corresponding ResourceN, in aspects, as indicated by a MPE parameter Xi (e.g., X1, X2, X3, X4). If a given value of Xi is set to one ("1"), the next ResourceN listed may be the paired resource. If a given value of Xi is not set to one, but is zero ("0"), the associated ResourceN may not be paired and may be individually reported. In the illustrated aspect, if X2=1 for Resoruce2, then Resource3 may be paired with Resource2, and MPE2 may likewise be paired with MPE3.

That is, in aspects, a subset of the set of MPE indication parameters associated with at least one of the first MPE resource pool or the second MPE resource pool may include a number of resources and corresponding MPE values. In one such aspect, each resource of the number of resources may be associated with a pairing indicator, of the set of MPE indication parameters, that identifies a pairing status of the resource with a next resource in the number of resources.

Figure 12:
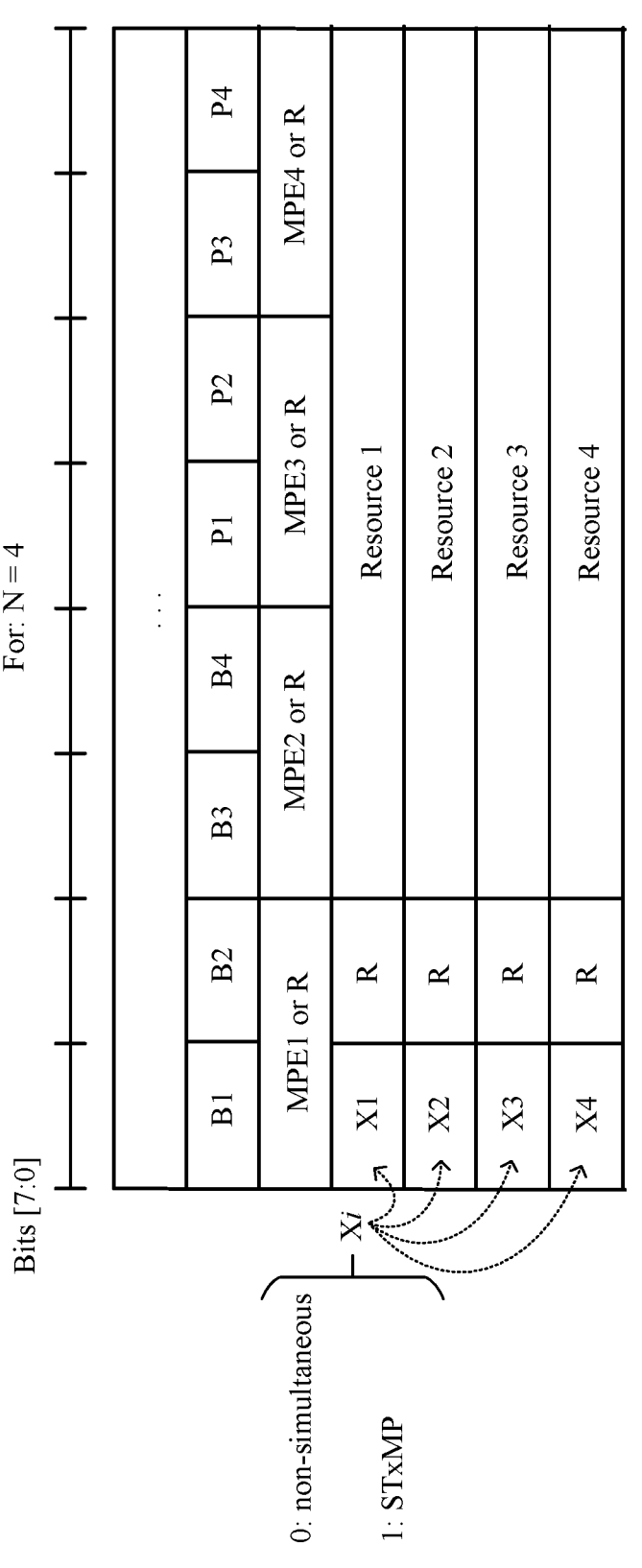
FIG. 12 is a diagram illustrating an example configuration for joint MPE reporting, in accordance with various aspects of the present disclosure.

FIG. 12 is a diagram 1200 illustrating an example configuration for joint MPE reporting, in various aspects. The illustrated configuration in diagram 1200 includes four resources, e.g., N=4, by way of example and not limitation, and the configuration in diagram 1200 may be an enhanced aspect of configuration 520 in FIG. 5 and/or an alternate aspect of the configurations described above in FIG. 10 and/or for configuration 1106 in FIG. 11. In aspects, based on the configuration in diagram 1200, a UE may be configured to report N resources (and corresponding MPE values), and for each reported resource, the UE may indicate whether the indicated MPE corresponds to a STxMP transmission or not. In such a configuration, there may be no explicit pairing between resources/MPE values, but instead a reported MPE may either correspond to when that beam is simultaneously transmitted with another beam or to non-simultaneous transmission. Such a configuration may be possible either with one resource pool or with two resource pools, as described herein.

For example, BN (e.g., B1, B2, B3, B4) may indicate whether a candidate beam information identified by a ResourceN (e.g., Resource1, Resource2, Resource3, Resource4) is present or not (e.g., may indicate the candidate beam identified by the number of entries in the corresponding "mpe-ResourcePoolToAddModList"). MPEN (e.g., MPE1, MPE2, MPE3, MPE4) may indicate the applied power backoff to meet MPE requirements (e.g., if the corresponding PN (e.g., P1, P2, P3, P4) is set to 1). PN may be set to 0 in instances where the applied P-MPR value is less than a threshold. Resource1 may indicate the first resource associated with an UL beam for which the MPE1 is reported within the MPE report. The MPE configuration (e.g., "MPE-Config-FR2") may include an integer value between 1-4 for a number of N resources (e.g., "numberOfN"), as well as a resource pool (e.g., "mpe-Resource-Pool") that may be based on a size of maximum MPE resources (e.g., "maxMPE-Resources", "MPE-Resource"). A given ResourceN (e.g., Resource1, Resource2, Resource3, Resource4) may be indicated as STxMP or as non-simultaneous, based on, or as indicated by, a MPE parameter Xi (e.g., X1, X2, X3, X4). If a given value of Xi is set to one ("1"), the ResourceN listed may be STxMP, while if a given value of Xi is not set to one, but is zero ("0"), the associated ResourceN may be non-simultaneous.

That is, in aspects, each resource of a number of resources may be associated with a multi-panel indicator, of the set of MPE indication parameters, that may identify a multi-panel status of the resource associated with simultaneous transmission across multiple panels (STxMP) at the UE.

Figure 13:
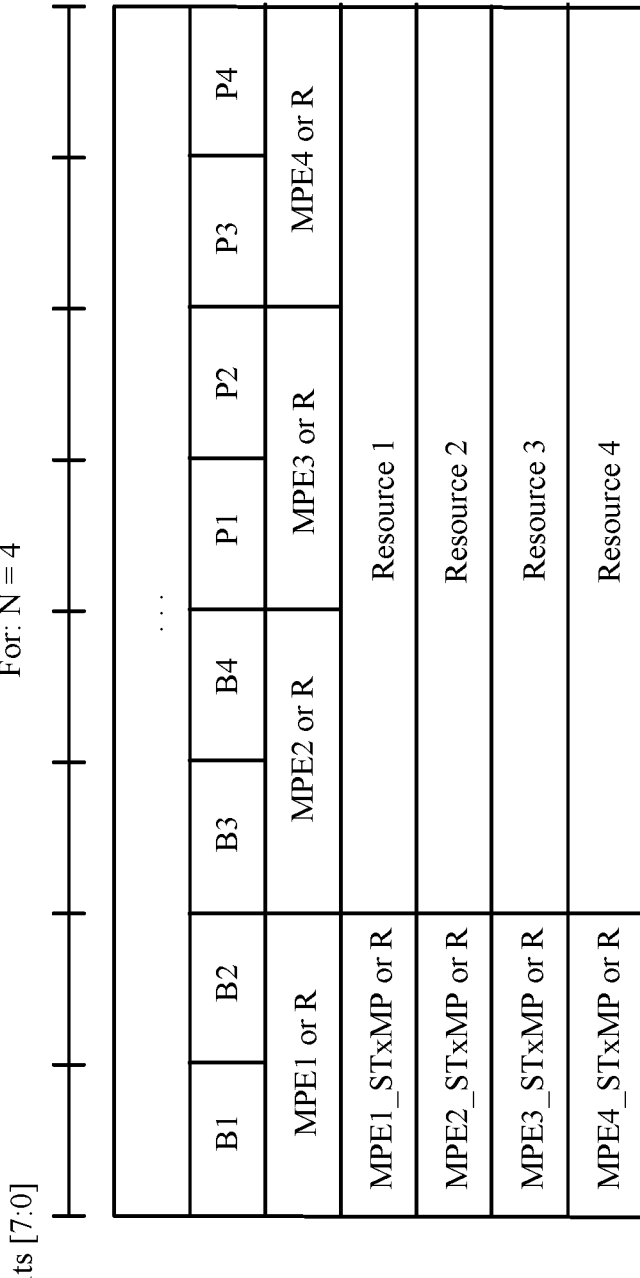
FIG. 13 is a diagram illustrating an example configuration for joint MPE reporting, in accordance with various aspects of the present disclosure.

FIG. 13 is a diagram 1300 illustrating an example configuration for joint MPE reporting, in various aspects. The illustrated configuration in diagram 1300 includes four resources, e.g., N=4, by way of example and not limitation, and the configuration in diagram 1300 may be an enhanced aspect of configuration 520 in FIG. 5 and/or an alternate aspect of the configuration described above in FIG. 12. In aspects, based on the configuration in diagram 1300, a UE may be configured to report N resources and 2N MPE values, where for each resource, the UE may be configured to report two MPE values (e.g., one as corresponding to STxMP and one corresponding to non-STxMP). In such a configuration, instead of the UE reporting the MPE for one of the two possibilities and indicating which one, as in the configuration for FIG. 12 described above, based on the configuration in diagram 1300, the UE may be configured to report MPE values for both possibilities (e.g., STxMP and non-STxMP). Such a configuration may be possible either with one resource pool or with two resource pools, as described herein.

For example, BN (e.g., B1, B2, B3, B4) may indicate whether a candidate beam information identified by a ResourceN (e.g., Resource1, Resource2, Resource3, Resource4) is present or not (e.g., may indicate the candidate beam identified by the number of entries in the corresponding "mpe-ResourcePoolToAddModList"). MPEN (e.g., MPE1, MPE2, MPE3, MPE4) may indicate the applied power backoff to meet MPE requirements for non-STxMP (e.g., if the corresponding PN (e.g., P1, P2, P3, P4) is set to 1). PN may be set to 0 in instances where the applied P-MPR value is less than a threshold. Resource1 may indicate the first resource associated with an UL beam for which the MPE1 is reported within the MPE report. The MPE configuration (e.g., "MPE-Config-FR2") may include an integer value between 1-4 for a number of N resources (e.g., "numberOfN"), as well as a resource pool (e.g., "mpe-ResourcePool") that may be based on a size of maximum MPE resources (e.g., "maxMPE-Resources", "MPE-Resource"). A given ResourceN (e.g., Resource1, Resource2, Resource3, Resource4) may include an MPE value for STxMP as MPENSTxMP (e.g., $MPE1_{STxMP}$, $MPE2_{STxMP}$, $MPE3_{STxMP}$, $MPE4_{STxMP}$). If a given value of $MPEN_{STxMP}$ is set, the ResourceN listed may include MPE values for both STxMP and non-STxMP transmissions, while if a given value of $MPEN_{STxMP}$ is not set, but is zero ("0") or is not included, the associated ResourceN may not include a simultaneous MPE value.

That is, in aspects, the corresponding MPE values for each resource of the number of resources, respectively, may include a first corresponding MPE value associated with simultaneous transmission across multiple panels (STxMP) at the UE and a second corresponding MPE value associated with a transmission type at the UE that is different than STxMP (e.g., non-simultaneous).

Figure 14:
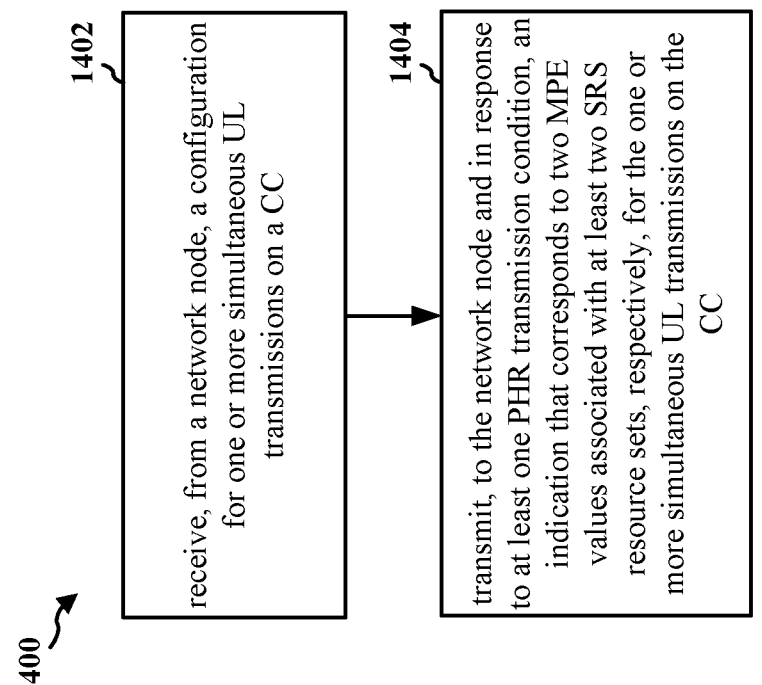
FIG. 14 is a flowchart of a method of wireless communication, in accordance with various aspects of the present disclosure.

FIG. 14 is a flowchart 1400 of a method of wireless communication. The method may be performed by a UE (e.g., the UE 104, 350, 702, 902; the apparatus 2004). In some aspects, the method may include aspects described in connection with the communication flow in FIG. 7. The method provides improvements in MPE reporting that enables a UE to provide MPE information to a network that can be used for single panel, multi-panel, or simultaneous transmission.

At 1402, the UE receives, from a network node, a configuration for two UL transmissions on a CC. In some aspects, the one or more simultaneous UL transmissions on the CC may be PUSCH transmissions. As an example, the reception may be performed by one or more of the component 198, the transceiver 2022, and/or the antenna 2080. FIG. 7 illustrates an example of a UE receiving a configuration for two UL transmissions.

At 1404, the UE transmits, to the network node and in response to at least one PHR transmission condition, an indication that corresponds to two MPE values associated with at least two SRS resource sets, respectively, for the one or more simultaneous UL transmissions on the CC. In some aspects, the indication may be a PHR or may be comprised in a PHR. FIG. 7 illustrates an example of a UE 702 transmitting an indication corresponding to MPE values, at 710. Transmitting the indication may include transmitting the PHR via a MAC-CE. As an example, the transmission may be performed by one or more of the component 198, the transceiver 2022, and/or the antenna 2080.

The at least two SRS resource sets may be associated with at least one of TCI states or transmission beams. The indication that corresponds to the two MPE values may include at least a respective MPE value and a maximum power value for each of the two MPE values identified as being present via the indication.

The two MPE values may be identified as being present via the indication, and the two MPE values may correspond to a single PUSCH that is associated with two TCI states and that is scheduled based on a single DCI for SDM. The two MPE values may be identified as being present via the indication, and where the two MPE values correspond to two PUSCHs, each associated with a different SRS resource set of the at least two SRS resource sets, that are scheduled based on respective DCI for STxMP. The indication may further indicate that the two PUSCHs are transmitted at least partially simultaneously in time.

In some aspects, the indication may be or may comprise a PHR, where to transmit the PHR, the at least one processor is configured to transmit the PHR via a MAC-CE, and the PHR may indicate a first of the two MPE values as being present and includes a first MPE value and an associated first maximum power value, and indicate a second of the two MPE values as being absent and excludes a second MPE value and an associated second maximum power value.

The UE may further transmit one or more uplink transmissions, such as one or more PUSCHs, as shown at 712 in FIG. 7.

Figure 15:
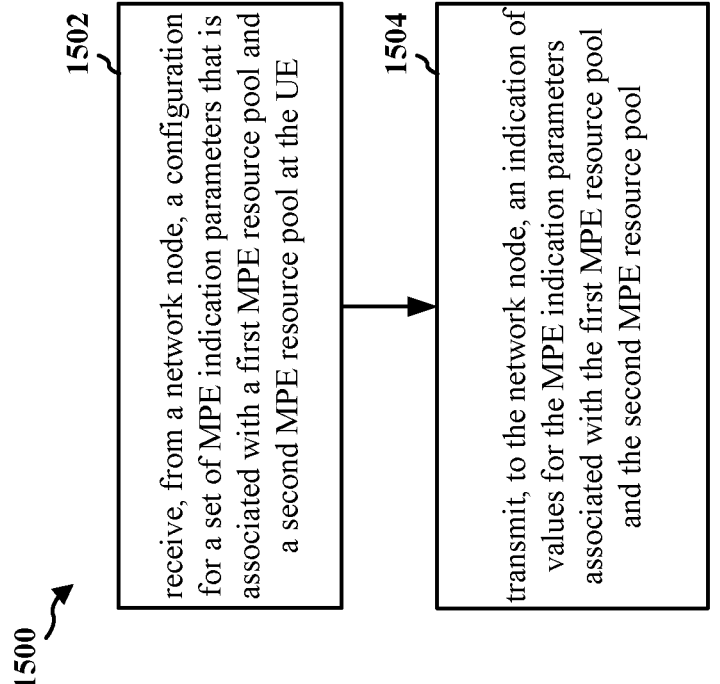
FIG. 15 is a flowchart of a method of wireless communication, in accordance with various aspects of the present disclosure.

FIG. 15 is a flowchart 1500 of a method of wireless communication. The method may be performed by a UE (e.g., the UE 104; 350, 702, 902; the apparatus 2004). In some aspects, the method may include aspects described in connection with the communication flow in FIG. 9. In some aspects, the method may include aspects described in connection with the communication flow in FIG. 7. The method provides improvements in MPE reporting that enables a UE to provide MPE information to a network that can be used for single panel, multi-panel, or simultaneous transmission.

At 1502, the UE receives, from a network node, a configuration for a set of MPE indication parameters that is associated with a first MPE resource pool and a second MPE resource pool at the UE. As an example, the reception may be performed by one or more of the component 198, the transceiver 2022, and/or the antenna 2080.

At 1504, the UE transmits, to the network node, an indication of values for the set of MPE indication parameters associated with the first MPE resource pool and the second MPE resource pool. FIG. 9 illustrates an example of a UE 902 transmitting an indication of values for the MPE parameters, at 912. As an example, the transmission may be performed by one or more of the component 198, the transceiver 2022, and/or the antenna 2080. In some aspects, the indication of values may be a PHR or may be comprised in a PHR in a MAC-CE.

In some aspects, a first subset of the set of MPE indication parameters associated with the first MPE resource pool may include a first number of resources and corresponding first MPE values. A second subset of the set of MPE indication parameters associated with the second MPE resource pool may include a second number of resources and corresponding second MPE values. The set of MPE indication parameters may include at least one resource pair and at least one corresponding pair of MPE values, where each of the at least one resource pair includes a first resource of the first MPE resource pool and a second resource of the second MPE resource pool. At least one of the first number of resources and the corresponding MPE values, the second number of resources and the corresponding second MPE values, or the at least one resource pair and the at least one corresponding pair of MPE values may be configured as disabled. In some aspects, at least one of the first number of resources and the corresponding MPE values or the second number of resources and the corresponding second MPE values may be associated with SDM on a single panel at the UE. In some aspects, the at least one resource pair and the at least one corresponding pair of the MPE values may be associated with STxMP at the UE.

In some aspects, a subset of the set of MPE indication parameters associated with at least one of the first MPE resource pool or the second MPE resource pool may include a number of resources and corresponding MPE values, and the set of MPE indication parameters may include at least one resource pair and at least one corresponding pair of MPE values, where each of the at least one resource pair includes a first resource of the first MPE resource pool and a second resource of the second MPE resource pool. In some aspects, at least one of the number of resources and the corresponding MPE values or the at least one resource pair and the at least one corresponding pair of MPE values may be configured as disabled. In some aspects, at least one of the first number of resources and the corresponding MPE values or the second number of resources and the corresponding second MPE values may be associated with SDM on a single panel at the UE. In some aspects, the at least one resource pair and the at least one corresponding pair of the MPE values may be associated with STxMP at the UE.

In some aspects, a subset of the set of MPE indication parameters associated with at least one of the first MPE resource pool or the second MPE resource pool may include at least one of a number of resources or at least one resource pair, and corresponding MPE values, where each of the at least one resource pair includes a first resource of the first MPE resource pool and a second resource of the second MPE resource pool. Each resource of the number of resources may be associated with a pairing indicator, of the set of MPE indication parameters, that identifies a pairing status of the resource with another resource.

In some aspects, a subset of the set of MPE indication parameters associated with at least one of the first MPE resource pool or the second MPE resource pool may include a number of resources and corresponding MPE values. In some aspects, each resource of the number of resources may be associated with a pairing indicator, of the set of MPE indication parameters, that identifies a pairing status of a corresponding resource with a next resource in the number of resources. In some aspects, each resource of the number of resources is associated with a multi-panel indicator, of the set of MPE indication parameters, that identifies a multi-panel status of a corresponding resource associated with STxMP at the UE. In some aspects, the corresponding MPE values for each resource of the number of resources, respectively, include a first corresponding MPE value associated with STxMP at the UE and a second corresponding MPE value associated with a transmission type at the UE that is different than the STxMP.

FIG. 16 is a flowchart 1600 of a method of wireless communication. The method may be performed by a UE (e.g., the UE 104, 350, 702, 902; the apparatus 2004). In some aspects, the method may include aspects described in connection with the communication flow in FIG. 9. In some aspects, the method may include aspects described in connection with the communication flow in FIG. 7. The method provides improvements in MPE reporting that enables a UE to provide MPE information to a network that can be used for single panel, multi-panel, or simultaneous transmission.

At 1604, the UE receives, from a network node, a configuration for a set of MPE indication parameters that is associated with a first MPE resource pool and a second MPE resource pool at the UE. As an example, the reception may be performed by one or more of the component 198, the transceiver 2022, and/or the antenna 2080.

At 1606, the UE transmits, to the network node, an indication of values for the set of MPE indication parameters associated with the first MPE resource pool and the second MPE resource pool. FIG. 9 illustrates an example of a UE 902 transmitting an indication of values for the MPE parameters, at 912. As an example, the transmission may be performed by one or more of the component 198, the transceiver 2022, and/or the antenna 2080. In some aspects, the indication of values may be a PHR or may be comprised in a PHR in a MAC-CE.

In some aspects, a first subset of the set of MPE indication parameters associated with the first MPE resource pool may include a first number of resources and corresponding first MPE values. A second subset of the set of MPE indication parameters associated with the second MPE resource pool may include a second number of resources and corresponding second MPE values. The set of MPE indication parameters may include at least one resource pair and at least one corresponding pair of MPE values, where each of the at least one resource pair includes a first resource of the first MPE resource pool and a second resource of the second MPE resource pool. At least one of the first number of resources and the corresponding MPE values, the second number of resources and the corresponding second MPE values, or the at least one resource pair and the at least one corresponding pair of MPE values may be configured as disabled. In some aspects, at least one of the first number of resources and the corresponding MPE values or the second number of resources and the corresponding second MPE values may be associated with SDM on a single panel at the UE. In some aspects, the at least one resource pair and the at least one corresponding pair of the MPE values may be associated with STxMP at the UE.

In some aspects, a subset of the set of MPE indication parameters associated with at least one of the first MPE resource pool or the second MPE resource pool may include a number of resources and corresponding MPE values, and the set of MPE indication parameters may include at least one resource pair and at least one corresponding pair of MPE values, where each of the at least one resource pair includes a first resource of the first MPE resource pool and a second resource of the second MPE resource pool. In some aspects, at least one of the number of resources and the corresponding MPE values or the at least one resource pair and the at least one corresponding pair of MPE values may be configured as disabled. In some aspects, at least one of the first number of resources and the corresponding MPE values or the second number of resources and the corresponding second MPE values may be associated with SDM on a single panel at the UE. In some aspects, the at least one resource pair and the at least one corresponding pair of the MPE values may be associated with STxMP at the UE.

In some aspects, a subset of the set of MPE indication parameters associated with at least one of the first MPE resource pool or the second MPE resource pool may include at least one of a number of resources or at least one resource pair, and corresponding MPE values, where each of the at least one resource pair includes a first resource of the first MPE resource pool and a second resource of the second MPE resource pool. Each resource of the number of resources may be associated with a pairing indicator, of the set of MPE indication parameters, that identifies a pairing status of the resource with another resource.

In some aspects, a subset of the set of MPE indication parameters associated with at least one of the first MPE resource pool or the second MPE resource pool may include a number of resources and corresponding MPE values. In some aspects, each resource of the number of resources may be associated with a pairing indicator, of the set of MPE indication parameters, that identifies a pairing status of a corresponding resource with a next resource in the number of resources. In some aspects, each resource of the number of resources is associated with a multi-panel indicator, of the set of MPE indication parameters, that identifies a multi-panel status of a corresponding resource associated with STxMP at the UE. In some aspects, the corresponding MPE values for each resource of the number of resources, respectively, include a first corresponding MPE value associated with STxMP at the UE and a second corresponding MPE value associated with a transmission type at the UE that is different than the STxMP.

In some aspects, as illustrated at 1602, the UE transmits a selection of the configuration for the set of MPE indication parameters, prior to its reception by the UE, from a set of MPE. FIG. 9 illustrates an example of a UE 902 transmitting a configuration selection, at 908.

In some aspects, the indication of the values for the set of MPE indication parameters may include at least one of MPE values corresponding to a resource pair or a MPE value associated with STxMP at the UE. As illustrated at 1608, the UE may transmit two PUSCHs on a CC based on an amount of power backoff that corresponds to MPE values associated with a resource pair or a MPE value associated with the STxMP at the UE. FIG. 9 illustrates an example of a UE 902 transmitting PUSCHs, at 914.

Figure 17:
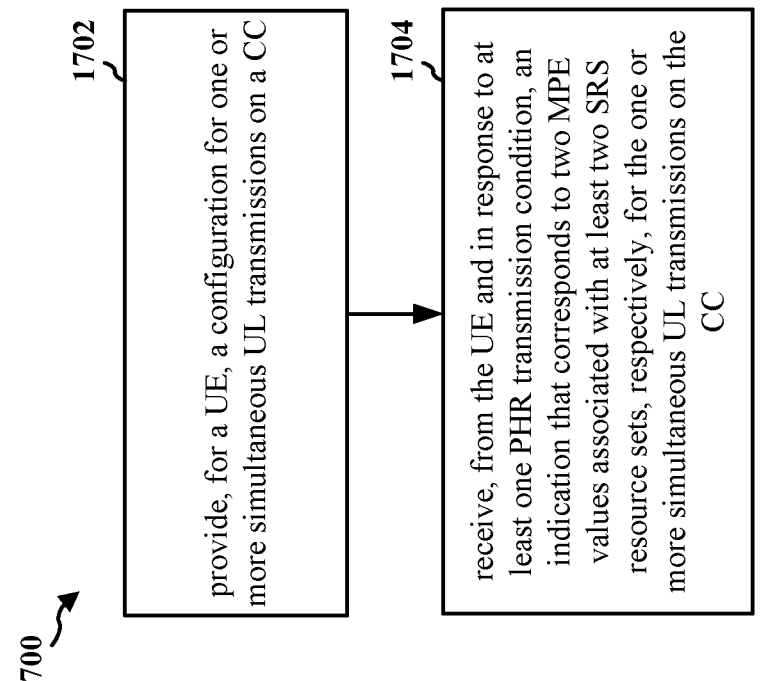
FIG. 17 is a flowchart of a method of wireless communication, in accordance with various aspects of the present disclosure.

FIG. 17 is a flowchart 1700 of a method of wireless communication. The method may be performed by a network node or network entity, such as a base station or a component of a base station (e.g., the base station 102, 310 704, 904; the CU 110; the DU 130; the RU 140; the network entity 2102. In some aspects, the method may include aspects described in connection with the communication flow in FIG. 7. In some aspects, the method may include aspects described in connection with the communication flow in FIG. 7. The method provides improvements in MPE reporting that enables a network node to receive MPE information from a UE that can be used for single panel, multi-panel, or simultaneous transmission.

At 1702, the network node provides, for a UE, a configuration for two UL transmissions on a CC. FIG. 7 illustrates an example of a base station 704 transmitting a configuration for two UL transmissions to a UE 702. As an example, the providing of the configuration may be performed, e.g., by any of the component 199, the transceiver 2146, and/or the antenna 2180 in FIG. 21. In some aspects, the one or more simultaneous UL transmissions on the CC may be PUSCHs.

At 1704, the network node receives, from the UE and in response to at least one PHR transmission condition, an indication that corresponds to two MPE values associated with at least two SRS resource sets, respectively, for the one or more simultaneous UL transmissions on the CC. FIG. 7 illustrates an example of a base station 704 receiving an indication corresponding to MPE values, at 710. As an example, the reception may be performed, e.g., by any of the component 199, the transceiver 2146, and/or the antenna 2180 in FIG. 21.

In some aspects, the indication may be or may be comprised in a PHR. The PHR may be received via a MAC-CE. In some aspects, the at least two SRS resource sets may be associated with TCI states and/or transmission beams.

The indication that corresponds to the two MPE values may include at least a respective MPE value and a maximum power value for each of the two MPE values identified as being present via the indication.

The two MPE values may be identified as being present via the indication, and the two MPE values may correspond to a single PUSCH that is associated with two TCI states and that is scheduled based on a single DCI for SDM. The two MPE values may be identified as being present via the indication, and where the two MPE values correspond to two PUSCHs, each associated with a different SRS resource set of the at least two SRS resource sets, that are scheduled based on respective DCI for STxMP. The indication may further indicate that the two PUSCHs are transmitted at least partially simultaneously in time.

In some aspects, the indication may be or may comprise a PHR, where to transmit the PHR, the at least one processor is configured to transmit the PHR via a MAC-CE, and the PHR may indicate a first of the two MPE values as being present and includes a first MPE value and an associated first maximum power value, and indicate a second of the two MPE values as being absent and excludes a second MPE value and an associated second maximum power value.

Figure 18:
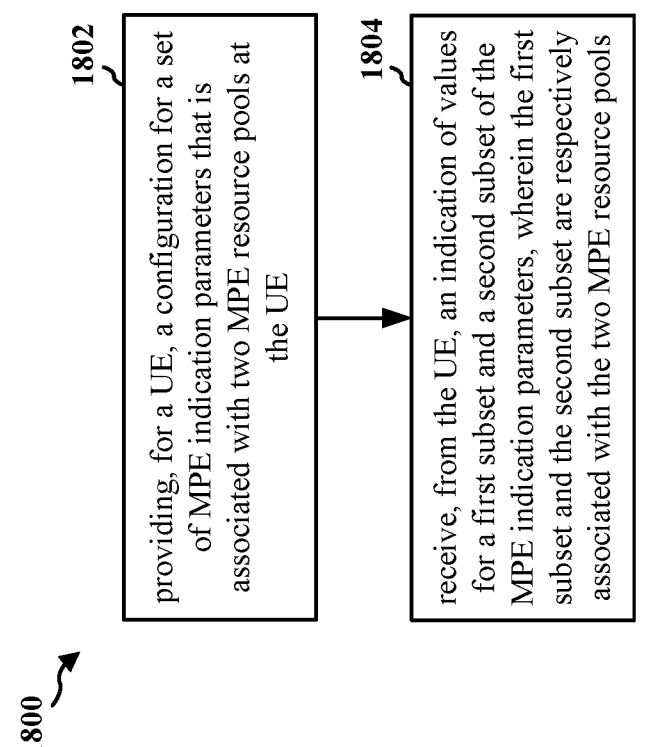
FIG. 18 is a flowchart of a method of wireless communication, in accordance with various aspects of the present disclosure.

FIG. 18 is a flowchart 1800 of a method of wireless communication. The method may be performed by a network node or network entity, such as a base station or a component of a base station (e.g., the base station 102, 310, 704, 904; the CU 110; the DU 130; the RU 140; the network entity 2102. In some aspects, the method may include aspects described in connection with the communication flow in FIG. 9. The method provides improvements in MPE reporting that enables a network node to receive MPE information from a UE that can be used for single panel, multi-panel, or simultaneous transmission.

At 1802, the network node provides, for a UE, a configuration for a set of MPE indication parameters that is associated with two MPE resource pools at the UE. As an example, the providing the configuration may be performed, e.g., by any of the component 199, the transceiver 2146, and/or the antenna 2180 in FIG. 21. FIG. 9 illustrates an example of a base station 904 transmitting a configuration to a UE 902, at 910.

At 1804, the network node receives, from the UE, an indication of values for a first subset and a second subset of the set of MPE indication parameters, where the first subset and the second subset are respectively associated with the two MPE resource pools. FIG. 9 illustrates an example of a base station 904 receiving an indication of values for MPE parameters, at 912. As an example, the reception may be performed, e.g., by any of the component 199, the transceiver 2146, and/or the antenna 2180 in FIG. 21. The indication of the values may be, may comprise, or may be comprised in a PHR in a MAC-CE.

In some aspects, a first subset of the set of MPE indication parameters associated with the first MPE resource pool may include a first number of resources and corresponding first MPE values. A second subset of the set of MPE indication parameters associated with the second MPE resource pool may include a second number of resources and corresponding second MPE values. The set of MPE indication parameters may include at least one resource pair and at least one corresponding pair of MPE values, where each of the at least one resource pair includes a first resource of the first MPE resource pool and a second resource of the second MPE resource pool. At least one of the first number of resources and the corresponding MPE values, the second number of resources and the corresponding second MPE values, or the at least one resource pair and the at least one corresponding pair of MPE values may be configured as disabled. In some aspects, at least one of the first number of resources and the corresponding MPE values or the second number of resources and the corresponding second MPE values may be associated with SDM on a single panel at the UE. In some aspects, the at least one resource pair and the at least one corresponding pair of the MPE values may be associated with STxMP at the UE.

In some aspects, a subset of the set of MPE indication parameters associated with at least one of the first MPE resource pool or the second MPE resource pool may include a number of resources and corresponding MPE values, and the set of MPE indication parameters may include at least one resource pair and at least one corresponding pair of MPE values, where each of the at least one resource pair includes a first resource of the first MPE resource pool and a second resource of the second MPE resource pool. In some aspects, at least one of the number of resources and the corresponding MPE values or the at least one resource pair and the at least one corresponding pair of MPE values may be configured as disabled. In some aspects, at least one of the first number of resources and the corresponding MPE values or the second number of resources and the corresponding second MPE values may be associated with SDM on a single panel at the UE. In some aspects, the at least one resource pair and the at least one corresponding pair of the MPE values may be associated with STxMP at the UE.

In some aspects, a subset of the set of MPE indication parameters associated with at least one of the first MPE resource pool or the second MPE resource pool may include at least one of a number of resources or at least one resource pair, and corresponding MPE values, where each of the at least one resource pair includes a first resource of the first MPE resource pool and a second resource of the second MPE resource pool. Each resource of the number of resources may be associated with a pairing indicator, of the set of MPE indication parameters, that identifies a pairing status of the resource with another resource.

In some aspects, a subset of the set of MPE indication parameters associated with at least one of the first MPE resource pool or the second MPE resource pool may include a number of resources and corresponding MPE values. In some aspects, each resource of the number of resources may be associated with a pairing indicator, of the set of MPE indication parameters, that identifies a pairing status of a corresponding resource with a next resource in the number of resources. In some aspects, each resource of the number of resources is associated with a multi-panel indicator, of the set of MPE indication parameters, that identifies a multi-panel status of a corresponding resource associated with STxMP at the UE. In some aspects, the corresponding MPE values for each resource of the number of resources, respectively, include a first corresponding MPE value associated with STxMP at the UE and a second corresponding MPE value associated with a transmission type at the UE that is different than the STxMP.

FIG. 19 is a flowchart 1900 of a method of wireless communication. The method may be performed by a network node or network entity, such as a base station or a component of a base station (e.g., the base station 102, 310 704, 904; the CU 110; the DU 130; the RU 140; the network entity 2102. In some aspects, the method may include aspects described in connection with the communication flow in FIG. 9. The method provides improvements in MPE reporting that enables a network node to receive MPE information from a UE that can be used for single panel, multi-panel, or simultaneous transmission.

At 1902, the network node provides, for a UE, a configuration for a set of MPE indication parameters that is associated with two MPE resource pools at the UE. As an example, the providing the configuration may be performed, e.g., by any of the component 199, the transceiver 2146, and/or the antenna 2180 in FIG. 21. FIG. 9 illustrates an example of a base station 904 transmitting a configuration to a UE 902, at 910.

At 1904, the network node receives, from the UE, an indication of values for a first subset and a second subset of the set of MPE indication parameters, where the first subset and the second subset are respectively associated with the two MPE resource pools. FIG. 9 illustrates an example of a base station 904 receiving an indication of values for MPE parameters, at 912. As an example, the reception may be performed, e.g., by any of the component 199, the transceiver 2146, and/or the antenna 2180 in FIG. 21. The indication of the values may be, may comprise, or may be comprised in a PHR in a MAC-CE.

In some aspects, a first subset of the set of MPE indication parameters associated with the first MPE resource pool may include a first number of resources and corresponding first MPE values. A second subset of the set of MPE indication parameters associated with the second MPE resource pool may include a second number of resources and corresponding second MPE values. The set of MPE indication parameters may include at least one resource pair and at least one corresponding pair of MPE values, where each of the at least one resource pair includes a first resource of the first MPE resource pool and a second resource of the second MPE resource pool. At least one of the first number of resources and the corresponding MPE values, the second number of resources and the corresponding second MPE values, or the at least one resource pair and the at least one corresponding pair of MPE values may be configured as disabled. In some aspects, at least one of the first number of resources and the corresponding MPE values or the second number of resources and the corresponding second MPE values may be associated with SDM on a single panel at the UE. In some aspects, the at least one resource pair and the at least one corresponding pair of the MPE values may be associated with STxMP at the UE.

In some aspects, a subset of the set of MPE indication parameters associated with at least one of the first MPE resource pool or the second MPE resource pool may include a number of resources and corresponding MPE values, and the set of MPE indication parameters may include at least one resource pair and at least one corresponding pair of MPE values, where each of the at least one resource pair includes a first resource of the first MPE resource pool and a second resource of the second MPE resource pool. In some aspects, at least one of the number of resources and the corresponding MPE values or the at least one resource pair and the at least one corresponding pair of MPE values may be configured as disabled. In some aspects, at least one of the first number of resources and the corresponding MPE values or the second number of resources and the corresponding second MPE values may be associated with SDM on a single panel at the UE. In some aspects, the at least one resource pair and the at least one corresponding pair of the MPE values may be associated with STxMP at the UE.

In some aspects, a subset of the set of MPE indication parameters associated with at least one of the first MPE resource pool or the second MPE resource pool may include at least one of a number of resources or at least one resource pair, and corresponding MPE values, where each of the at least one resource pair includes a first resource of the first MPE resource pool and a second resource of the second MPE resource pool. Each resource of the number of resources may be associated with a pairing indicator, of the set of MPE indication parameters, that identifies a pairing status of the resource with another resource.

In some aspects, a subset of the MPE indication parameters associated with at least one of the first MPE resource pool or the second MPE resource pool may include a number of resources and corresponding MPE values. In some aspects, each resource of the number of resources may be associated with a pairing indicator, of the set of MPE indication parameters, that identifies a pairing status of a corresponding resource with a next resource in the number of resources. In some aspects, each resource of the number of resources is associated with a multi-panel indicator, of the set of MPE indication parameters, that identifies a multi-panel status of a corresponding resource associated with STxMP at the UE. In some aspects, the corresponding MPE values for each resource of the number of resources, respectively, include a first corresponding MPE value associated with STxMP at the UE and a second corresponding MPE value associated with a transmission type at the UE that is different than the STxMP.

In some aspects, the indication of values for the set of MPE indication parameters may include at least one of MPE values associated with a resource pair or a MPE value associated with STxMP at the UE. As illustrated at 1906, the network node may receive two PUSCHs on a CC based on an amount of power backoff that corresponds to the MPE values associated with a resource pair or the MPE value associated with the STxMP at the UE. FIG. 9 illustrates an example of a base station 904 receiving PUSCHs at 914.

In some aspects, the network node may receive an indication of a configuration selection, as shown at 908 in FIG. 9.

Figure 20:
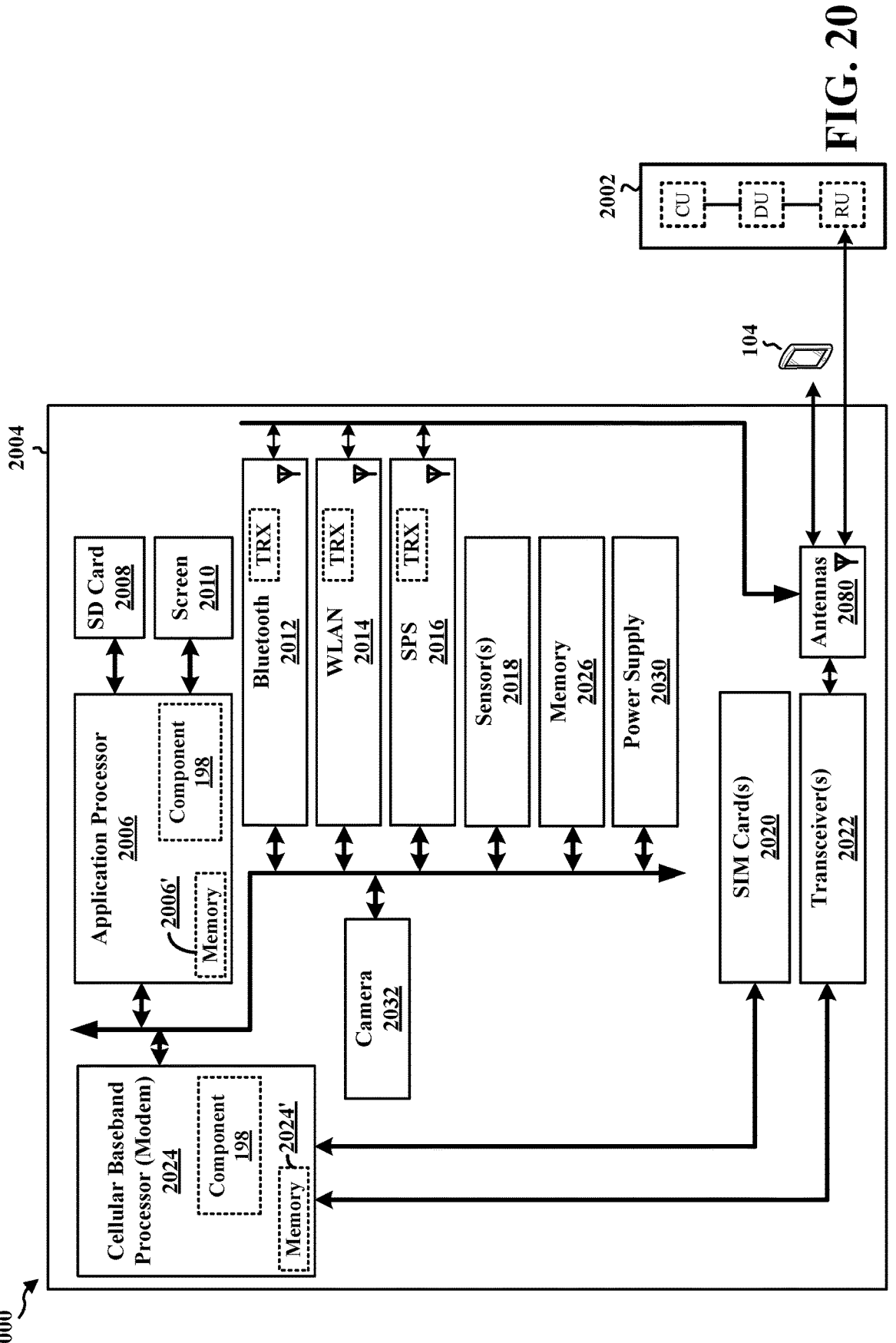
FIG. 20 is a diagram illustrating an example of a hardware implementation for an example apparatus and/or network entity.

FIG. 20 is a diagram 2000 illustrating an example of a hardware implementation for an apparatus 2004. The apparatus 2004 may be a UE, a component of a UE, or may implement UE functionality. In some aspects, the apparatus 2004 may include a cellular baseband processor 2024 (also referred to as a modem) coupled to one or more transceivers 2022 (e.g., cellular RF transceiver). The cellular baseband processor 2024 may include on-chip memory 2024'. In some aspects, the apparatus 2004 may further include one or more subscriber identity modules (SIM) cards 2020 and an application processor 2006 coupled to a secure digital (SD) card 2008 and a screen 2010. The application processor 2006 may include on-chip memory 2006'. In some aspects, the apparatus 2004 may further include a Bluetooth module 2012, a WLAN module 2014, an SPS module 2016 (e.g., GNSS module), one or more sensor modules 2018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2026, a power supply 2030, and/or a camera 2032. The Bluetooth module 2012, the WLAN module 2014, and the SPS module 2016 may include an on-chip transceiver (TRX) (or in some cases, just a receiver (RX)). The Bluetooth module 2012, the WLAN module 2014, and the SPS module 2016 may include their own dedicated antennas and/or utilize the antennas 2080 for communication. The cellular baseband processor 2024 communicates through the transceiver(s) 2022 via one or more antennas 2080 with the UE 104 and/or with an RU associated with a network entity 2002. The cellular baseband processor 2024 and the application processor 2006 may each include a computer-readable medium/memory 2024', 2006', respectively. The additional memory modules 2026 may also be considered a computer-readable medium/memory. Each computer-readable medium/memory 2024', 2006', 2026 may be non-transitory. The cellular baseband processor 2024 and the application processor 2006 are each responsible for general processing, including the execution of software stored on the computer-readable medium/memory. The software, when executed by the cellular baseband processor 2024/application processor 2006, causes the cellular baseband processor 2024/application processor 2006 to perform the various functions described supra. The computer-readable medium/memory may also be used for storing data that is manipulated by the cellular baseband processor 2024/application processor 2006 when executing software. The cellular baseband processor 2024/application processor 2006 may be a component of the UE 350 and may include the memory 360 and/or at least one of the TX processor 368, the RX processor 356, and the controller/processor 359. In one configuration, the apparatus 2004 may be a processor chip (modem and/or application) and include just the cellular baseband processor 2024 and/or the application processor 2006, and in another configuration, the apparatus 2004 may be the entire UE (e.g., see 350 of FIG. 3) and include the additional modules of the apparatus 2004.

As discussed supra, the component 198 may be configured receive, from a network node, a configuration for one or more simultaneous uplink (UL) transmissions on a CC; and transmit, to the network node and in response to at least one PHR transmission condition, an indication that corresponds to two MPE values associated with at least two SRS resource sets, respectively, for the one or more simultaneous UL transmissions on the CC. In some aspects, the component 198 may be configured to receive, from a network node, a configuration for a set of MPE indication parameters that is associated with a first MPE resource pool and a second MPE resource pool at the UE; and transmit, to the network node, an indication of values for the set of MPE indication parameters associated with the first MPE resource pool and the second MPE resource pool. The component 198 may be further configured to transmit a selection of the configuration for the set of MPE indication parameters, prior to its reception by the UE, from a set of MPE configurations. In some aspects, the indication of values for the set of MPE indication parameters may include at least one of MPE values corresponding to a resource pair or a MPE value associated with simultaneous transmission across multiple panels (STxMP) at the UE, and the component 198 may be further configured to transmit two PUSCHs on a CC based on an amount of power backoff that corresponds to the MPE values associated with the resource pair or the MPE value associated with the STxMP at the UE. The component 198 may be further configured to perform any of the aspects described in connection with the flowchart in any of FIGS. 14-16, and/or any of the aspects performed by the UE in any of FIG. 7 or FIG. 9. The component 198 may be within the cellular baseband processor 2024, the application processor 2006, or both the cellular baseband processor 2024 and the application processor 2006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2004 may include a variety of components configured for various functions. In one configuration, the apparatus 2004, and in particular the cellular baseband processor 2024 and/or the application processor 2006, may include means for receiving, from a network node, a configuration for two UL transmissions on a CC; and means for transmitting, to the network node and in response to at least one PHR transmission condition, an indication that corresponds to two MPE values associated with at least two SRS resource sets, respectively, for the one or more simultaneous UL transmissions on the CC. The apparatus may include means for receiving, from a network node, a configuration for a set of MPE indication parameters that is associated with a first MPE resource pool and a second MPE resource pool at the UE; and means for transmitting, to the network node, an indication of values for the set of MPE indication parameters associated with the first MPE resource pool and the second MPE resource pool. The apparatus may further include means for transmitting a selection of the configuration for the set of MPE indication parameters, prior to its reception by the UE, from a set of MPE configurations. The indication of values for the MPE indication parameters may include at least one of MPE values corresponding to a resource pair or a MPE value associated with STxMP at the UE, and the apparatus may include means for transmitting two PUSCHs on a CC based on an amount of power backoff that corresponds to the MPE values associated with the resource pair or the MPE value associated with the STxMP at the UE. The apparatus may further include means to perform any of the aspects described in connection with the flowchart in any of FIGS. 14-16, and/or any of the aspects performed by the UE in any of FIG. 7 or FIG. 9. The means may be the component 198 of the apparatus 2004 configured to perform the functions recited by the means. As described supra, the apparatus 2004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 21:
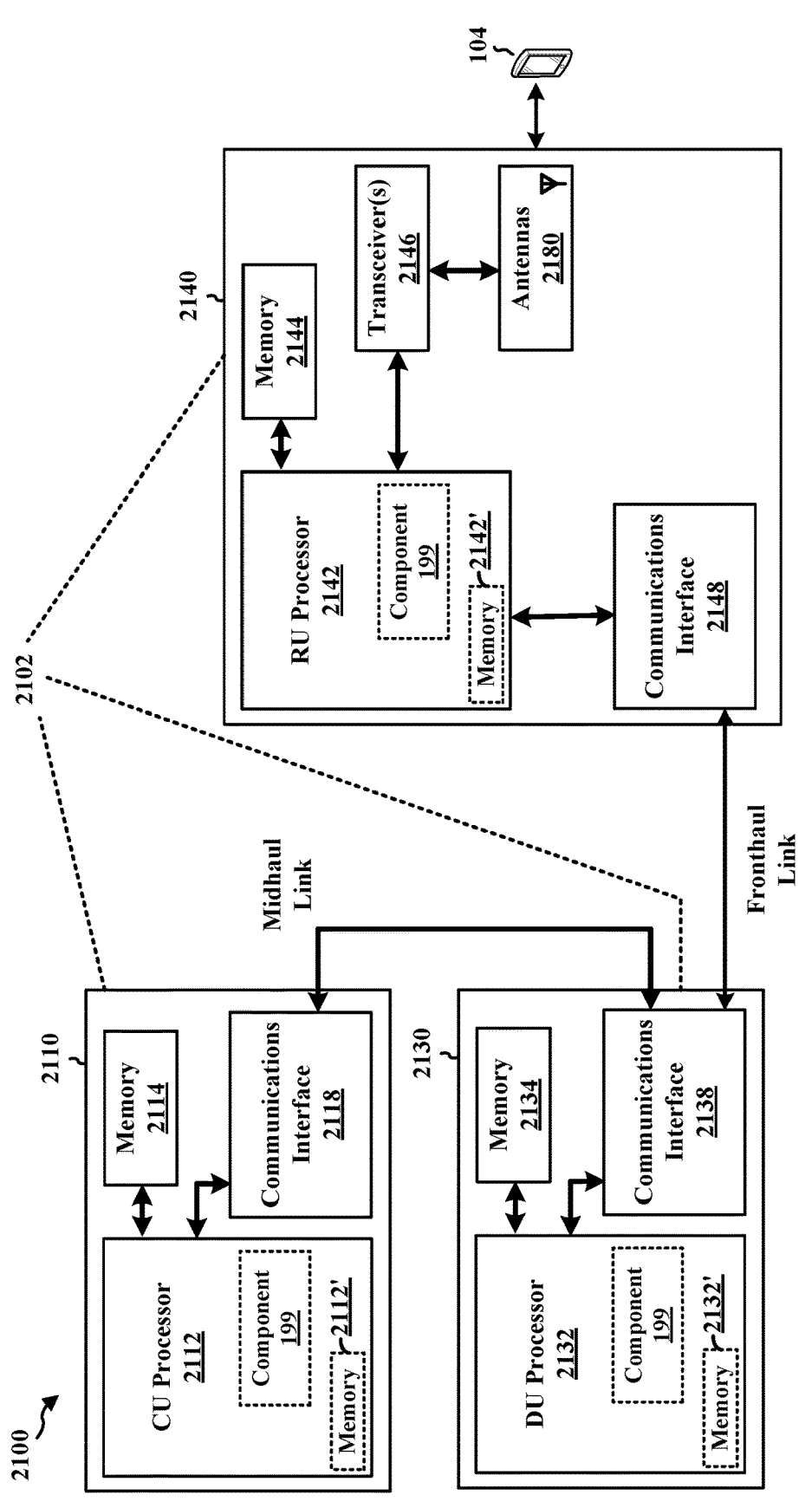
FIG. 21 is a diagram illustrating an example of a hardware implementation for an example network entity.

FIG. 21 is a diagram 2100 illustrating an example of a hardware implementation for a network entity 2102. The network entity 2102 may be a BS, a component of a BS, or may implement BS functionality. The network entity 2102 may include at least one of a CU 2110, a DU 2130, or an RU 2140. For example, depending on the layer functionality handled by the component 199, the network entity 2102 may include the CU 2110; both the CU 2110 and the DU 2130; each of the CU 2110, the DU 2130, and the RU 2140; the DU 2130; both the DU 2130 and the RU 2140; or the RU 2140. The CU 2110 may include a CU processor 2112. The CU processor 2112 may include on-chip memory 2112'. In some aspects, the CU 2110 may further include additional memory modules 2114 and a communications interface 2118. The CU 2110 communicates with the DU 2130 through a midhaul link, such as an F1 interface. The DU 2130 may include a DU processor 2132. The DU processor 2132 may include on-chip memory 2132'. In some aspects, the DU 2130 may further include additional memory modules 2134 and a communications interface 2138. The DU 2130 communicates with the RU 2140 through a fronthaul link. The RU 2140 may include an RU processor 2142. The RU processor 2142 may include on-chip memory 2142'. In some aspects, the RU 2140 may further include additional memory modules 2144, one or more transceivers 2146, antennas 2180, and a communications interface 2148. The RU 2140 communicates with the UE 104. The on-chip memory 2112', 2132', 2142' and the additional memory modules 2114, 2134, 2144 may each be considered a computer-readable medium/memory. Each computer-readable medium/memory may be non-transitory. Each of the processors 2112, 2132, 2142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to provide, for a UE, a configuration for two UL transmissions on a CC; and receiving, from the UE and in response to at least one PHR transmission condition, an indication that corresponds to two MPE values associated with at least two SRS resource sets, respectively, for the one or more simultaneous UL transmissions on the CC. The component 199 may be configured to provide, for a UE, a configuration for a set of MPE indication parameters that is associated with two MPE resource pools at the UE; and receive, from the UE, an indication of values for a first subset and a second subset of the set of MPE indication parameters, where the first subset and the second subset are respectively associated with the two MPE resource pools. In some aspects, the indication of values for the set of MPE indication parameters includes at least one of MPE values corresponding to a resource pair or a MPE value associated with STxMP at the UE, and the component 199 may be further configured to receive two PUSCHs on a CC based on an amount of power backoff that corresponds to the MPE values associated with the resource pair or the MPE value associated with the STxMP at the UE. The component 199 may be further configured to perform any of the aspects described in connection with the flowcharts in FIGS. 17, 18, and/or 19, and/or the aspects performed by the network in FIG. 7 or 9. The component 199 may be within one or more processors of one or more of the CU 2110, DU 2130, and the RU 2140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2102 may include a variety of components configured for various functions. In one configuration, the network entity 2102 includes means for may include means for providing, for a UE, a configuration for two UL transmissions on a CC; and means for receiving, from the UE and in response to at least one PHR transmission condition, an indication that corresponds to two MPE values associated with at least two SRS resource sets, respectively, for the one or more simultaneous UL transmissions on the CC. The network entity may include means for providing, for a UE, a configuration for a set of MPE indication parameters that is associated with two MPE resource pools at the UE; and means for receiving, from the UE, an indication of values for a first subset and a second subset of the set of MPE indication parameters, where the first subset and the second subset are respectively associated with the two MPE resource pools. In some aspects, the indication of values for the set of MPE indication parameters includes at least one of MPE values corresponding to a resource pair or a MPE value associated with STxMP at the UE, and the apparatus may further include means for receiving two PUSCHs on a CC based on an amount of power backoff that corresponds to the MPE values associated with the resource pair or the MPE value associated with the STxMP at the UE. The network entity may further include means for performing any of the aspects described in connection with the flowcharts in FIGS. 17, 18, and/or 19, and/or the aspects performed by the network in FIG. 7 or 9. The means may be the component 199 of the network entity 2102 configured to perform the functions recited by the means. As described supra, the network entity 2102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising receiving, from a network node, a configuration for one or more simultaneous uplink (UL) transmissions on a component carrier (CC); and transmitting, to the network node and in response to at least one power headroom report (PHR) transmission condition, an indication that corresponds to two maximum permissible exposure (MPE) values associated with at least two sounding reference signal (SRS) resource sets, respectively, for the one or more simultaneous UL transmissions on the CC.

Aspect 2 is the method of aspect 1, where the one or more simultaneous UL transmissions on the CC are physical uplink shared channel (PUSCH) transmissions, and where the indication is comprised in a PHR; and where transmitting the PHR includes transmitting, via at least one transceiver of the UE, the PHR via a medium access control (MAC) control element (MAC-CE).

Aspect 3 is the method of any of aspects 1 and 2, where the at least two SRS resource sets are associated with at least one of transmission configuration indication (TCI) states or transmission beams.

Aspect 4 is the method of any of aspects 1 to 3, where the indication that corresponds to the two MPE values includes at least a respective MPE value and a maximum power value for each of the two MPE values identified as being present via the indication.

Aspect 5 is the method of aspect 4, where the two MPE values are identified as being present via the indication, and where the two MPE values correspond to a single physical uplink shared channel (PUSCH) that is associated with two transmission configuration indication (TCI) states and that is scheduled based on a single downlink control information (DCI) for spatial division multiplexing (SDM).

Aspect 6 is the method of aspect 4, where the two MPE values are identified as being present via the indication, and where the two MPE values correspond to two physical uplink shared channels (PUSCHs), each associated with a different SRS resource set of the at least two SRS resource sets, that are scheduled based on respective downlink control information (DCI) for simultaneous transmission across multiple panels (STxMP).

Aspect 7 is the method of aspect 6, where the indication further indicates that the two PUSCHs are transmitted at least partially simultaneously in time.

Aspect 8 is the method of any of aspects 1 to 7, where the indication is a PHR, where transmitting the PHR includes transmitting the PHR via a medium access control (MAC) control element (MAC-CE), and where the PHR: indicates a first of the two MPE values as being present and includes a first MPE value and an associated first maximum power value, and indicates a second of the two MPE values as being absent and excludes a second MPE value and an associated second maximum power value.

Aspect 9 is a method of wireless communication at a user equipment (UE), comprising: receiving, from a network node, a configuration for a set of maximum permissible exposure (MPE) indication parameters that is associated with a first MPE resource pool and a second MPE resource pool at the UE; and transmitting, to the network node, an indication of values for the set of MPE indication parameters associated with the first MPE resource pool and the second MPE resource pool.

Aspect 10 is the method of aspect 9, where the first MPE resource pool and the second MPE resource pool are associated with a sounding reference signal (SRS) resource set that includes at least one of: one or more channel state information reference signal (CSI-RS) resources, or one or more synchronization signal (SS) blocks (SSBs).

Aspect 11 is the method of any of aspects 9 and 10, where a first subset of the set of MPE indication parameters associated with the first MPE resource pool includes a first number of resources and corresponding first MPE values; where a second subset of the set of MPE indication parameters associated with the second MPE resource pool includes a second number of resources and corresponding second MPE values; and where the set of MPE indication parameters include at least one resource pair and at least one corresponding pair of MPE values, where each of the at least one resource pair includes a first resource of the first MPE resource pool and a second resource of the second MPE resource pool.

Aspect 12 is the method of aspect 11, where at least one of the first number of resources and the corresponding first MPE values, the second number of resources and the corresponding second MPE values, or the at least one resource pair and the at least one corresponding pair of MPE values are configured as disabled.

Aspect 13 is the method of aspect 11, where at least one of the first number of resources and the corresponding first MPE values or the second number of resources and the corresponding second MPE values are associated with spatial division multiplexing (SDM) on a single panel at the UE; or where the at least one resource pair and the at least one corresponding pair of the MPE values are associated with simultaneous transmission across multiple panels (STxMP) at the UE.

Aspect 14 is the method of any of aspects 9 and 10, where a subset of the set of MPE indication parameters associated with at least one of the first MPE resource pool or the second MPE resource pool includes a number of resources and corresponding MPE values; and where the set of MPE indication parameters include at least one resource pair and at least one corresponding pair of MPE values, where each of the at least one resource pair includes a first resource of the first MPE resource pool and a second resource of the second MPE resource pool.

Aspect 15 is the method of aspect 14, where the number of resources and the corresponding MPE values are configured as disabled.

Aspect 16 is the method of aspect 14, where the at least one resource pair and the at least one corresponding pair of MPE values are configured as disabled.

Aspect 17 is the method of any of aspects 9 and 10, where a subset of the set of MPE indication parameters associated with at least one of the first MPE resource pool or the second MPE resource pool includes at least one of a number of resources or at least one resource pair, and corresponding MPE values, where each of the at least one resource pair includes a first resource of the first MPE resource pool and a second resource of the second MPE resource pool.

Aspect 18 is the method of aspect 17, where each resource of the number of resources is associated with a pairing indicator, of the set of MPE indication parameters, that identifies a pairing status of the resource with another resource.

Aspect 19 is the method of any of aspects 9 and 10, where a subset of the set of MPE indication parameters associated with at least one of the first MPE resource pool or the second MPE resource pool includes a number of resources and corresponding MPE values.

Aspect 20 is the method of aspect 19, where each resource of the number of resources is associated with a pairing indicator, of the set of MPE indication parameters, that identifies a pairing status of a corresponding resource with a next resource in the number of resources.

Aspect 21 is the method of aspect 19, where each resource of the number of resources is associated with a multi-panel indicator, of the set of MPE indication parameters, that identifies a multi-panel status of a corresponding resource associated with simultaneous transmission across multiple panels (STxMP) at the UE.

Aspect 22 is the method of aspect 19, where the corresponding MPE values for each resource of the number of resources, respectively, include a first corresponding MPE value associated with simultaneous transmission across multiple panels (STxMP) at the UE and a second corresponding MPE value associated with a transmission type at the UE that is different than the STxMP.

Aspect 23 is the method of any of aspects 9 to 22, further comprising: transmitting, via at least one transceiver of the UE, a selection of the configuration for the set of MPE indication parameters, prior to its reception by the UE, from a set of MPE configurations.

Aspect 24 is a method of wireless communication at a network node, comprising: providing, for a user equipment (UE), a configuration for one or more simultaneous uplink (UL) transmissions on a component carrier (CC); and receiving, from the UE and in response to at least one power headroom report (PHR) transmission condition, an indication that corresponds to two maximum permissible exposure (MPE) values associated with at least two sounding reference signal (SRS) resource sets, respectively, for the one or more simultaneous UL transmissions on the CC.

Aspect 25 is the method of aspect 24, where the one or more simultaneous UL transmissions on the CC are physical uplink shared channels (PUSCHs), and where the indication is a PHR; and where receiving the PHR includes receiving, via at least one transceiver of the network node, the PHR via a medium access control (MAC) control element (MAC-CE).

Aspect 26 is the method of any of aspects 24 and 25, where the at least two SRS resource sets are associated with at least one of transmission configuration indication (TCI) states or transmission beams.

Aspect 27 is the method of any of aspects 24 to 26, where the indication that corresponds to the two MPE values includes at least a respective MPE value and a maximum power value for each of the two MPE values identified as being present via the indication.

Aspect 28 is a method of wireless communication at a network node, comprising: providing, for a user equipment (UE), a configuration for a set of maximum permissible exposure (MPE) indication parameters that is associated with two MPE resource pools at the UE; and receiving, from the UE, an indication of values for a first subset and a second subset of the set of MPE indication parameters, where the first subset and the second subset are respectively associated with the two MPE resource pools.

Aspect 29 is the method of aspect 28, where the two MPE resource pools are associated with a sounding reference signal (SRS) resource set that includes at least one of: one or more channel state information reference signal (CSI-RS) resources, or one or more synchronization signal (SS) blocks (SSBs).

Aspect 30 is the method of any of aspects 28 and 29, further comprising: receiving, via at least one transceiver of the network node, two physical uplink shared channels (PUSCHs) on a component carrier (CC) based on an amount of power backoff that corresponds to MPE values associated with a resource pair or a MPE value associated with simultaneous transmission across multiple panels (STxMP) at the UE.

Aspect 31 is an apparatus for wireless communication including means for implementing any of aspects 1 to 8.

Aspect 32 is a computer-readable medium (e.g., a non-transitory computer-readable medium) storing computer executable code, the code when executed by at least one processor causes the at least one processor to implement any of aspects 1 to 8.

Aspect 33 is an apparatus for wireless communication at a network node. The apparatus includes a memory; and at least one processor coupled to the memory and, based at least in part on information stored in the memory, the at least one processor is configured to implement any of aspects 1 to 8.

Aspect 34 is the apparatus of aspect 33, further including at least one of a transceiver or an antenna coupled to the at least one processor.

Aspect 35 is an apparatus for wireless communication including means for implementing any of aspects 9 to 23.

Aspect 36 is a computer-readable medium (e.g., a non-transitory computer-readable medium) storing computer executable code, the code when executed by at least one processor causes the at least one processor to implement any of aspects 9 to 23.

Aspect 37 is an apparatus for wireless communication at a network node. The apparatus includes a memory; and at least one processor coupled to the memory and, based at least in part on information stored in the memory, the at least one processor is configured to implement any of aspects 9 to 23.

Aspect 38 is the apparatus of aspect 37, further including at least one of a transceiver or an antenna coupled to the at least one processor.

Aspect 39 is an apparatus for wireless communication including means for implementing any of aspects 24 to 27.

Aspect 40 is a computer-readable medium (e.g., a non-transitory computer-readable medium) storing computer executable code, the code when executed by at least one processor causes the at least one processor to implement any of aspects 24 to 27.

Aspect 41 is an apparatus for wireless communication at a network node. The apparatus includes a memory; and at least one processor coupled to the memory and, based at least in part on information stored in the memory, the at least one processor is configured to implement any of aspects 24 to 27.

Aspect 42 is the apparatus of aspect 41, further including at least one of a transceiver or an antenna coupled to the at least one processor.

Aspect 43 is an apparatus for wireless communication including means for implementing any of aspects 28 to 30.

Aspect 44 is a computer-readable medium (e.g., a non-transitory computer-readable medium) storing computer executable code, the code when executed by at least one processor causes the at least one processor to implement any of aspects 28 to 30.

Aspect 45 is an apparatus for wireless communication at a network node. The apparatus includes a memory; and at least one processor coupled to the memory and, based at least in part on information stored in the memory, the at least one processor is configured to implement any of aspects 28 to 30.

Aspect 46 is the apparatus of aspect 45, further including at least one of a transceiver or an antenna coupled to the at least one processor.

What is claimed is:

1. An apparatus for wireless communication at a user equipment (UE), comprising:
   memory; and
   at least one processor coupled to the memory and, based at least in part on information stored in the memory, the at least one processor is configured to:
   receive, from a network node, a configuration for one or more simultaneous uplink (UL) transmissions on a component carrier (CC); and
   transmit, to the network node and in response to at least one power headroom report (PHR) transmission condition, an indication that corresponds to two maximum permissible exposure (MPE) values associated with at least two sounding reference signal (SRS) resource sets, respectively, for the one or more simultaneous UL transmissions on the CC.

2. The apparatus of claim 1, further comprising:
   at least one transceiver coupled to the at least one processor, wherein the one or more simultaneous UL transmissions on the CC are physical uplink shared channel (PUSCH) transmissions, and wherein the indication is comprised in a PHR; and
   wherein to transmit the PHR, the at least one processor is configured to transmit, via the at least one transceiver, the PHR via a medium access control (MAC) control element (MAC-CE).

3. The apparatus of claim 1, wherein the at least two SRS resource sets are associated with at least one of transmission configuration indication (TCI) states or transmission beams.

4. The apparatus of claim 1, wherein the indication that corresponds to the two MPE values includes at least a respective MPE value and a maximum power value for each of the two MPE values identified as being present via the indication.

5. The apparatus of claim 4, wherein the two MPE values are identified as being present via the indication, and wherein the two MPE values correspond to a single physical uplink shared channel (PUSCH) that is associated with two transmission configuration indication (TCI) states and that is scheduled based on a single downlink control information (DCI) for spatial division multiplexing (SDM).

6. The apparatus of claim 4, wherein the two MPE values are identified as being present via the indication, and wherein the two MPE values correspond to two physical uplink shared channels (PUSCHs), each associated with a different SRS resource set of the at least two SRS resource sets, that are scheduled based on respective downlink control information (DCI) for simultaneous transmission across multiple panels (STxMP).

7. The apparatus of claim 6, wherein the indication further indicates that the two PUSCHs are transmitted at least partially simultaneously in time.

8. The apparatus of claim 1, wherein the indication is a PHR, wherein to transmit the PHR, the at least one processor is configured to transmit the PHR via a medium access control (MAC) control element (MAC-CE), and wherein the PHR:
   indicates a first of the two MPE values as being present and includes a first MPE value and an associated first maximum power value, and
   indicates a second of the two MPE values as being absent and excludes a second MPE value and an associated second maximum power value.

9. An apparatus for wireless communication at a user equipment (UE), comprising:
   memory; and
   at least one processor coupled to the memory and, based at least in part on information stored in the memory, the at least one processor is configured to:
   receive, from a network node, a configuration for a set of maximum permissible exposure (MPE) indication parameters that is associated with a first MPE resource pool and a second MPE resource pool at the UE; and
   transmit, to the network node, an indication of values for the set of MPE indication parameters associated with the first MPE resource pool and the second MPE resource pool.

10. The apparatus of claim 9, wherein the first MPE resource pool and the second MPE resource pool are associated with a sounding reference signal (SRS) resource set that includes at least one of:
   one or more channel state information reference signal (CSI-RS) resources, or
   one or more synchronization signal (SS) blocks (SSBs).

11. The apparatus of claim 9, wherein a first subset of the set of MPE indication parameters associated with the first MPE resource pool includes a first number of resources and corresponding first MPE values;

wherein a second subset of the set of MPE indication parameters associated with the second MPE resource pool includes a second number of resources and corresponding second MPE values; and wherein the set of MPE indication parameters include at least one resource pair and at least one corresponding pair of MPE values, wherein each of the at least one resource pair includes a first resource of the first MPE resource pool and a second resource of the second MPE resource pool.

12. The apparatus of claim 11, wherein at least one of the first number of resources and the corresponding first MPE values, the second number of resources and the corresponding second MPE values, or the at least one resource pair and the at least one corresponding pair of MPE values are configured as disabled.

13. The apparatus of claim 11, wherein at least one of the first number of resources and the corresponding first MPE values or the second number of resources and the corresponding second MPE values are associated with spatial division multiplexing (SDM) on a single panel at the UE; or wherein the at least one resource pair and the at least one corresponding pair of the MPE values are associated with simultaneous transmission across multiple panels (STxMP) at the UE.

14. The apparatus of claim 9, wherein a subset of the set of MPE indication parameters associated with at least one of the first MPE resource pool or the second MPE resource pool includes a number of resources and corresponding MPE values; and wherein the set of MPE indication parameters include at least one resource pair and at least one corresponding pair of MPE values, wherein each of the at least one resource pair includes a first resource of the first MPE resource pool and a second resource of the second MPE resource pool.

15. The apparatus of claim 14, wherein the number of resources and the corresponding MPE values are configured as disabled.

16. The apparatus of claim 14, wherein the at least one resource pair and the at least one corresponding pair of MPE values are configured as disabled.

17. The apparatus of claim 9, wherein a subset of the set of MPE indication parameters associated with at least one of the first MPE resource pool or the second MPE resource pool includes at least one of a number of resources or at least one resource pair, and corresponding MPE values, wherein each of the at least one resource pair includes a first resource of the first MPE resource pool and a second resource of the second MPE resource pool.

18. The apparatus of claim 17, wherein each resource of the number of resources is associated with a pairing indicator, of the set of MPE indication parameters, that identifies a pairing status of the resource with another resource.

19. The apparatus of claim 9, wherein a subset of the set of MPE indication parameters associated with at least one of the first MPE resource pool or the second MPE resource pool includes a number of resources and corresponding MPE values.

20. The apparatus of claim 19, wherein each resource of the number of resources is associated with a pairing indicator, of the set of MPE indication parameters, that identifies a pairing status of a corresponding resource with a next resource in the number of resources.

21. The apparatus of claim 19, wherein each resource of the number of resources is associated with a multi-panel indicator, of the set of MPE indication parameters, that identifies a multi-panel status of a corresponding resource associated with simultaneous transmission across multiple panels (STxMP) at the UE.

22. The apparatus of claim 19, wherein the corresponding MPE values for each resource of the number of resources, respectively, include a first corresponding MPE value associated with simultaneous transmission across multiple panels (STxMP) at the UE and a second corresponding MPE value associated with a transmission type at the UE that is different than the STxMP.

23. The apparatus of claim 9, further comprising:

at least one transceiver coupled to the at least one processor and configured to:

transmit a selection of the configuration for the set of MPE indication parameters, prior to its reception by the UE, from a set of MPE configurations.

24. An apparatus for wireless communication at a network node, comprising:

memory; and at least one processor coupled to the memory and, based at least in part on information stored in the memory, the at least one processor is configured to:

provide, for a user equipment (UE), a configuration for one or more simultaneous uplink (UL) transmissions on a component carrier (CC); and receive, from the UE and in response to at least one power headroom report (PHR) transmission condition, an indication that corresponds to two maximum permissible exposure (MPE) values associated with at least two sounding reference signal (SRS) resource sets, respectively, for the one or more simultaneous UL transmissions on the CC.

25. The apparatus of claim 24, further comprising:

at least one transceiver coupled to the at least one processor, wherein the one or more simultaneous UL transmissions on the CC are physical uplink shared channels (PUSCHs), and wherein the indication is a PHR;

wherein to receive the PHR the at least one processor is configured to receive, via the at least one transceiver, the PHR via a medium access control (MAC) control element (MAC-CE).

26. The apparatus of claim 24, wherein the at least two SRS resource sets are associated with at least one of transmission configuration indication (TCI) states or transmission beams.

27. The apparatus of claim 24, wherein the indication that corresponds to the two MPE values includes at least a respective MPE value and a maximum power value for each of the two MPE values identified as being present via the indication.

28. An apparatus for wireless communication at a network node, comprising:

memory; and at least one processor coupled to the memory and, based at least in part on information stored in the memory, the at least one processor is configured to:

provide, for a user equipment (UE), a configuration for a set of maximum permissible exposure (MPE) indication parameters that is associated with two MPE resource pools at the UE; and receive, from the UE, an indication of values for a first subset and a second subset of the set of MPE indication parameters, wherein the first subset and the second subset are respectively associated with the two MPE resource pools.

29. The apparatus of claim 28, wherein the two MPE resource pools are associated with a sounding reference signal (SRS) resource set that includes at least one of:
  one or more channel state information reference signal (CSI-RS) resources, or one or more synchronization signal (SS) blocks (SSBs).

30. The apparatus of claim 28, further comprising:
  at least one transceiver coupled to the at least one processor, wherein the at least one processor is further configured to:
  receive, via the at least one transceiver, two physical uplink shared channels (PUSCHs) on a component carrier (CC) based on an amount of power backoff that corresponds to MPE values associated with a resource pair or a MPE value associated with simultaneous transmission across multiple panels (STxMP) at the UE.

* * * * *